(12) United States Patent
Chan

(10) Patent No.: US 6,789,961 B2
(45) Date of Patent: Sep. 14, 2004

(54) PHOTOGRAPHIC FILM CONTAINER, FILM ASSEMBLY AND LOADING METHOD

(75) Inventor: Yet Chan, Kowloon (HK)

(73) Assignee: Ever Perfect Holdings, Ltd. (HK)

( * ) Notice: Subject to any disclaimer, the term of this patent is extended or adjusted under 35 U.S.C. 154(b) by 59 days.

(21) Appl. No.: 10/141,751

(22) Filed: May 9, 2002

(65) Prior Publication Data

US 2003/0007791 A1 Jan. 9, 2003

Related U.S. Application Data

(62) Division of application No. 09/495,223, filed on Jan. 31, 2000.

(51) Int. Cl.[7] .................. G03B 17/26; B65D 85/67; G11B 23/107
(52) U.S. Cl. .................. 396/512; 206/389; 206/407; 242/348
(58) Field of Search .................. 396/512, 511, 396/513, 388; 206/389, 391, 393, 407, 410, 578; 242/348, 348.4

(56) References Cited

U.S. PATENT DOCUMENTS

| | | | |
|---|---|---|---|
| 3,537,376 A | * | 11/1970 | Fleming ............ 396/513 |
| 4,524,920 A | * | 6/1985 | Kidawara et al. ...... 396/512 X |
| 4,889,292 A | * | 12/1989 | Loewe et al. ......... 242/348.4 |
| 5,296,887 A | * | 3/1994 | Zander ............... 396/512 |
| 5,311,231 A | | 5/1994 | Suzuki et al. ......... 396/6 |
| 5,348,239 A | | 9/1994 | Enomoto ............. 242/348.4 |
| 5,619,298 A | * | 4/1997 | Stiehler ............... 396/399 |
| 5,838,998 A | | 11/1998 | Yamazaki et al. ...... 396/6 |
| 5,933,657 A | | 8/1999 | Watkins et al. ........ 396/6 |
| 6,240,259 B1 | * | 5/2001 | Gable ................. 396/512 X |
| 6,447,176 B2 | * | 9/2002 | White et al. ........ 396/513 |

FOREIGN PATENT DOCUMENTS

| | | | | |
|---|---|---|---|---|
| TH | | 20241 | 8/1996 | ....... G03B/17/02 |
| WO | WO 99/60442 | | 11/1999 | ....... G03B/17/00 |

* cited by examiner

Primary Examiner—W. B. Perkey
(74) Attorney, Agent, or Firm—Samuels, Gauthier & Stevens

(57) ABSTRACT

A method of loading a film assembly comprising a first film container (13) which may be a conventional film cassette and an additional film container (15, 102, 202, 302, 402, 502) having a length of film wound in one of the containers and extending to the other, comprises the steps of: (a) providing a coiled length of film which may be a bulk roll (52) and attaching a free end to a film winding tool (34); (b) rotating the film winding tool (34) to wind the film into a coil about the tool (34); (c) before or after step (b), enclosing the coil in the additional film container (15, 102, 202, 302, 402, 502) so that the film extends through a film slot thereof, and removing the film winding tool (34). The invention also resides in a film container for use in the method, and in an assembly so formed.

33 Claims, 30 Drawing Sheets

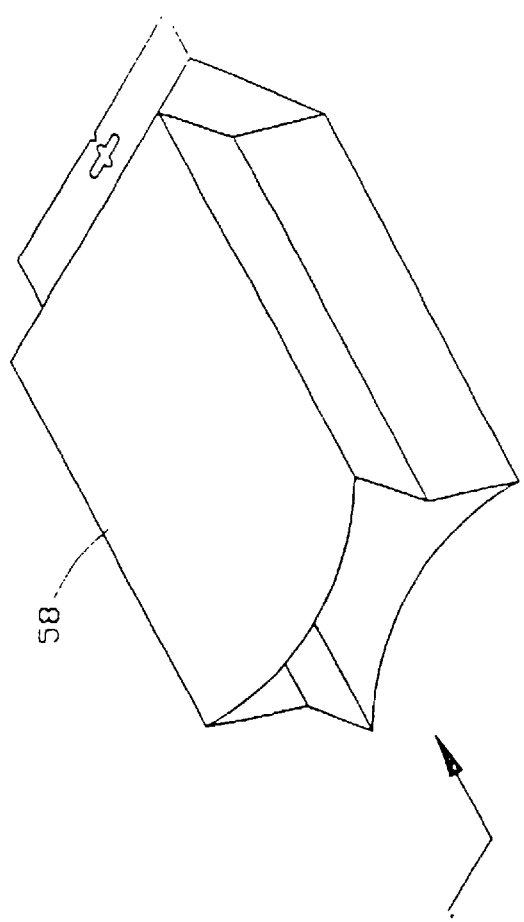
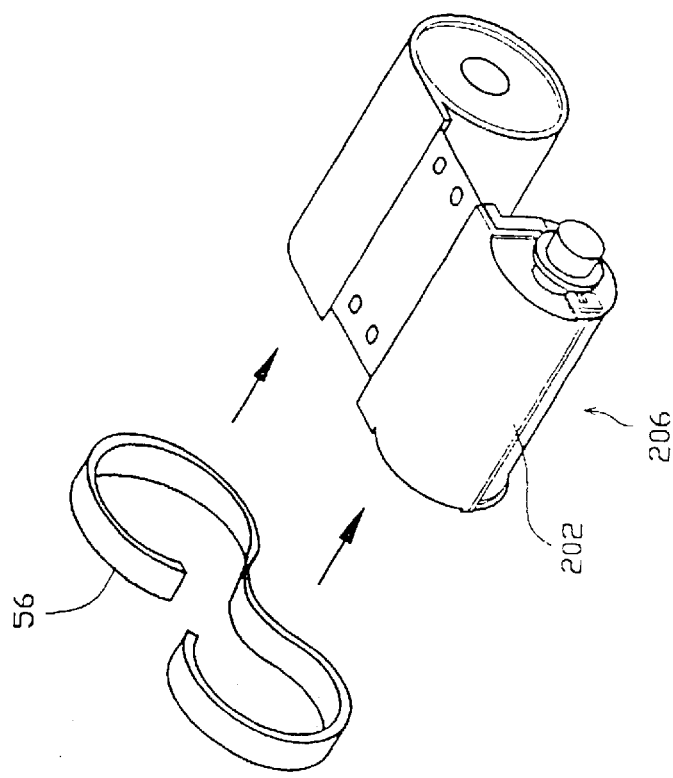
FIG. 31

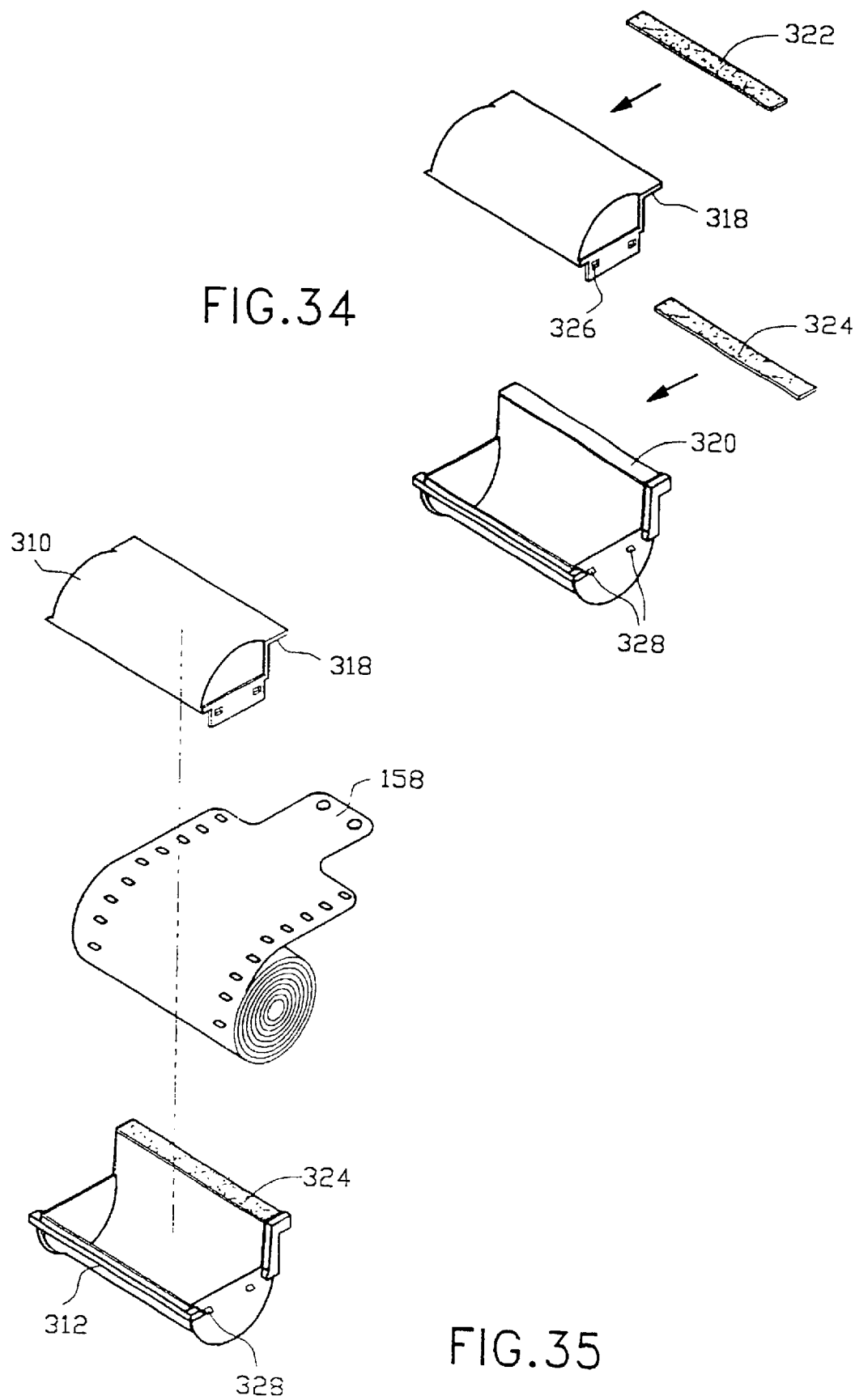

PHOTOGRAPHIC FILM CONTAINER, FILM ASSEMBLY AND LOADING METHOD

This is a division of application Ser. No. 09/495,223 filed Jan. 31, 2000.

BACKGROUND OF THE INVENTION

The present invention relates to a film container which can be used in combination with a film cassette to give a film assembly for use in simple cameras, to a method of loading the film assembly, and to a camera so loaded.

In recent years cameras known variously as disposable or single-use cameras, or referred to by some as lens-fitted photographic film packages, have become increasingly popular. These are cameras of simple construction and low cost which are usually pre-loaded with film by the manufacturer. It is usually arranged that the film is unwound from a standard film cassette or patrone on assembly of the camera, and as pictures are sequentially taken the film is wound back into the cassette. Once the user finishes the film, the user returns the entire camera to the photolab for developing of the film. The manufacturer may then either discard the camera in its entirety, or subject to appropriate checks that the camera is still functional, re-load the camera. Alternatively the manufacturer may re-use specific components of the camera.

One consideration with such a camera is the ease of loading of the film, particularly given the requirement that the film must be pre-wound out of the film cassette before use. In view of the low cost of the camera itself manufacture and assembly costs are important, and this includes the cost of loading the film into the camera at the factory. It is highly desirable to utilize a method which is simple and cheap and yet reliable.

As the awareness of problems of environmental contamination increases, as well as for economic reasons, consumers are less willing to tolerate disposable products. It has previously been proposed by the applicant to provide a very simple and cheap camera of generally similar construction to a disposable camera and yet which includes adaptations allowing it to be re-used at least several times by a user.

The present invention seeks to provide a method of loading a film assembly comprising a pair of film containers for use in a simple camera as described above, to a film container and to a film loading method.

SUMMARY OF THE INVENTION

According to the present invention there is provided a method of loading a film assembly comprising a first film container and an additional film container having a length of film wound in one of the containers and extending to the other, comprising the steps of: (a) providing a length of film and attaching a free end to a film winding tool; (b) in a dark environment rotating the film winding tool to wind the film into a coil about the tool; (c) before or after step (b), enclosing the coil in an additional film container so that the film extends through a film slot thereof, and removing the film winding tool.

In one embodiment, at step (a) the length of film is provided wound in the first film container and extending through a film slot thereof, the film being unwound from the first film container as the film is wound onto the film winding tool. The first film container may be a conventional film patrone, with the film secured to the central spool thereof.

In an embodiment utilizing an additional container which comprises a housing which is closed by an end cap, the method involves, at step (c), winding the film onto the film winding tool, followed by insertion of the tool having the film wound about the tool end into the additional film container. After removal of the film winding tool the end cap is secured to the housing. The tool end having the leading end of the film secured thereto is inserted into the additional film container, and the tool then rotated to wind the film into the additional container.

Alternatively, the tool end having the leading end of the film secured thereto may be inserted into the additional film container with the film extending from the film slot, and the tool then rotated to wind the film into the container followed by closing the container with the end cap.

In an alternative embodiment the length of film is supplied from a bulk roll of film, and after the film is wound into the additional film container the film is cut from the roll and the film end opposite to the said free end is secured to the first film container. Where the first film container is a conventional film patrone the cut film end is secured to a central spool of the film patrone.

In a further alternative embodiment utilizing an additional film container which comprises a housing formed in two half shells which co-operate to define a film slot therebetween, and a film winding tool aperture, the method involves the step of, in a film winding apparatus, before step (b) providing a first shell half on one side of the film winding tool, followed by securing the second shell half to the first shell half with the film extending through the film slot, and then rotating the film winding tool to wind the film into the additional film container. The method comprises the further steps of withdrawing the tool from the film container and closing the tool winding aperture with a plug. Where the film is unwound from a bulk roll of film, the method includes the step of cutting the film from the bulk roll after it has been wound into the additional container. Where the first container is a conventional film patrone having a central spool, the free end of the film cut from the bulk roll being secured to the central spool.

In a still further alternative utilizing an additional film container which comprises a housing formed in two half shells which co-operate to define a film slot therebetween, but without any winding tool aperture the method involves the step of, in a film winding apparatus, after step (b), removing the film winding tool, followed by enclosing the wound coil between the two half shells, with the film extending from the film slot. Where the film is unwound from a bulk roll of film, the method includes the step of cutting the film from the bulk roll after it has been wound into the additional container. Where the first container is a conventional film patrone having a central spool, the free end of the film cut from the bulk roll is secured to a central spool.

Subsequent to film loading the assembly may be secured by attaching a removable clip to secure the containers together. The assembly may also be sealed in a protective package for sale to a user.

The invention also resides in a film assembly when loaded accorded to the above described methods, and to a camera when having such a film assembly loaded therein.

In a further aspect the invention resides in a method of loading a film assembly into a camera having a pair of film chambers arranged on opposite sides of an exposure opening and a camera back which closes the film chambers comprising the steps of: (a) providing a first film container; (b)

providing a length of film and attaching a free end to a film winding tool; (c) in a dark environment rotating the film winding tool to wind the film into a coil about the tool; (d) before or after step (c), enclosing the coil in an additional film container so that the film extends through a film slot thereof; (e) removing the film winding tool; and (f) placing the film assembly in the camera with the containers in respective chambers and closing the camera back.

The film may be conventional colour or black and white film, but may also carry pre-exposed latent images thereon, the method involving at step (f) the additional step of ensuring that an alignment mark on the film is arranged in alignment with an alignment mark on the camera so as to ensure correct alignment of user-exposed images and pre-exposed images.

The invention also resides in a film assembly comprising a first film container having a spool therein to which an end of the film is attached, and a second spoolless light-tight film container within which the film is wound having a removable end cap, the film being wound in a coil in the second film container and extending to the first container.

The invention further resides in a photographic film-receiving container having a housing comprising a pair of shell halves which together define a film slot through which, in use, film may extend. The container may have a housing which which further defines an aperture for insertion of a film winding tool. Each shell half may be provided with an edge region which faces the edge region of the other shell half defining the film slot therebetween, each edge region being provided with a strip of soft fabric or fabric-like material thereon. There may be securing means providing a snap-fit connection between the shell halves.

The edge regions defining the film slot define an exit plane, the shell halves of the housing being joined along a plane substantially parallel to said exit plane. Alternatively, the shell halves may be joined along a plane substantially perpendicular thereto.

In a still further aspect to the invention resides in a method of film winding comprising the steps of: (a) withdrawing the free end of a film from a first film cassette and attaching a film winding tool thereto; (b) in a dark environment, rotating the film winding tool to wind the film out of the first film container around the film winding tool; (c) before or after step (b), inserting the end of film winding tool having the film secured thereto into an open second spoolless film container; (d) withdrawing the film winding tool; and (e) attaching an end cap to the open end of the second film container to render this light-tight. The film may be wound out of the first film container onto the film winding tool, followed by insertion of the tool having the film wound about the tool into the second film container. Alternatively, the tool end having the leading end of the film secured thereto is inserted into the second film container, and the tool then rotated to wind the film into the second container.

In a still further aspect the invention resides in a method of loading film into a camera having a pair of film chambers arranged on opposite sides of an exposure opening, and a camera back which closes the chambers comprising the steps of: (a) withdrawing the free end of a film from a first film cassette and attaching a film winding tool thereto; (b) in a dark environment, rotating the film winding tool to wind the film out of the first film container around the tool; (c) before or after step (b), inserting the end of film winding tool having the film secured thereto into an open second spoolless film container;(d) attaching an end cap to the open end of the second film container to render this light-tight; (e) with the back open, inserting the first and second containers into the respective chambers with the film extending therebetween; and (f) closing the camera back.

In a still further aspect the invention resides in a film assembly comprising a first film container having a spool therein to which an end of the film is attached and about which the film may be wound, and a second spoolless light-tight film container within which the film may be wound having a removable end cap, the film extending between the first and second containers and being wound within one or other of said containers, wherein securing means are provided to hold the first and second containers in a fixed position relative to each other.

BRIEF DESCRIPTION OF THE DRAWINGS

Embodiments of the invention are now described, by way of example only, the reference to the following drawings in which:

FIG. 31 shows the finished film assembly being secured by a film clip and sealed into a film package;

FIG. 34 shows the assembled form of an alternative film container;

FIG. 35 shows the placing of the wound film roll into the film container;

DETAILED DESCRIPTION OF THE PREFERRED EMBODIMENTS

Figure 1:
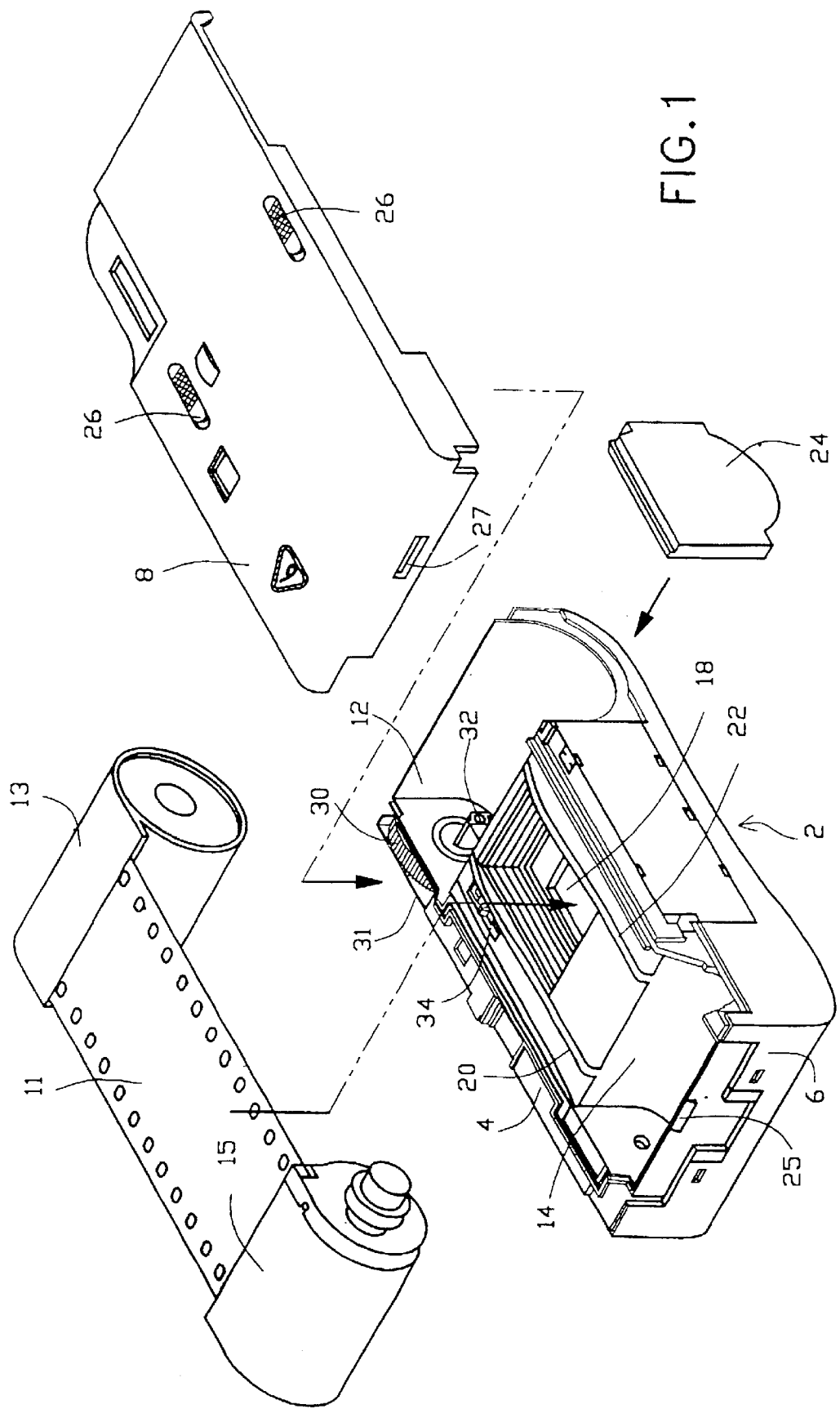
FIG. 1 shows the insertion of a film assembly in accordance with an embodiment of the invention into an open camera.

Turning to the drawings, FIG. 1 shows the loading of a film assembly into a camera 2. The camera is of simple type in which film is wound back into a film cassette as pictures are taken. As seen in FIG. 1, the camera includes a main body part 4 which carries the majority of the operative components of the camera 2, and a front cover part 6 and rear cover part 8 which together enclose the main body 4. The main body 4 supports a lens assembly (not visible), a front portion of which extends through an aperture in the front cover part 6, and behind which is arranged a shutter assembly as is entirely conventional and well understood by those skilled in the art. The main body 4 defines part of a first film-cassette receiving chamber 12 which receives a film-containing cassette or patrone 13 which is preferably a conventional 35 mm patrone having a central rotatable spool on which the film is wound. Other standard film formats can equally be accommodated with appropriate modification. A second film receiving chamber 14 is arranged at the opposite side of the camera. Between the film chambers 12 and 14 is arranged an exposure window 18 located between upper and lower film guides 20, 22 which support the film at its edges as it extends between the film chambers. A film passageway for the film to travel between the film chambers 12 and 14 is defined between the back cover 8 and opposed region of the main body 4 and film guides 20, 22. The main body 4, and front and rear cover parts 6, 8 define an opening at the lower end of the film cassette chamber 12, which is closed in us by a removable cover plate 24, allowing removal of the film cassette 13 through the opening once the film has been exposed. As is known in the art, the cover plate 24 and adjacent parts of the main body 4 are provided with appropriate adaptations in the form of co-operating grooves on the cover plate 24 and flanges on the main body 4 which together ensure light-tight closure of the opening.

Figure 7:
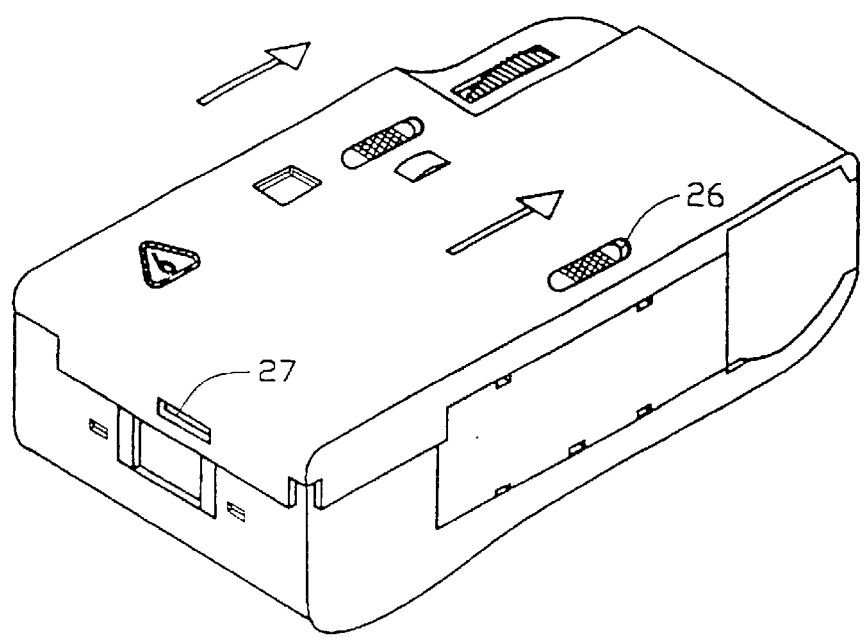
FIG. 7 illustrates the first step of opening the camera back.

The rear cover part 8 is removably fitted to the main body 4. This is achieved by providing at opposite edges a pair of protrusions 25 on the main body 4 which snap-fit into apertures 27 on the back cover 8. The back cover 8 may also be provided with releasable locking means or a latch including a pair of finger slides 26 having an inwardly directed movable pin (not visible) on the rear cover 8, movable between an open position as shown in FIG. 1 where the rear cover 8 can be simply push-fitted on to the rear of the main body 4 with the pin extending into a recess formed on the main body, and a locking position where the pin engages beneath a lug moulded on the main body 4. FIG. 7 shows the direction of movement of the slide 26 to achieve unlocking. These arrangements allow the user to readily open and close the camera for re-loading films therein.

As is conventional, the camera is provided with a wind-on mechanism including a rotatable film advance wheel or thumb wheel 30 held on top of the main body 4 beneath a plate 31 having a plurality of teeth, and lower shaped drive shaft 32 which extends into and engages the central spool of a conventional film patrone 13. The mechanism includes a film sprocket wheel 34 located just above the film exposure window 18, and a film counter. The film sprocket wheel 34 is operatively connected to the re-cocking mechanism of the shutter, so that each time the film is wound on one frame by the user (by turning the film advance wheel), the film sprocket wheel is rotated one turn, which brings a lever of the shutter back to its primed position, and in addition prevents further rotation of the film advance wheel 30, as is conventional.

Figure 3:
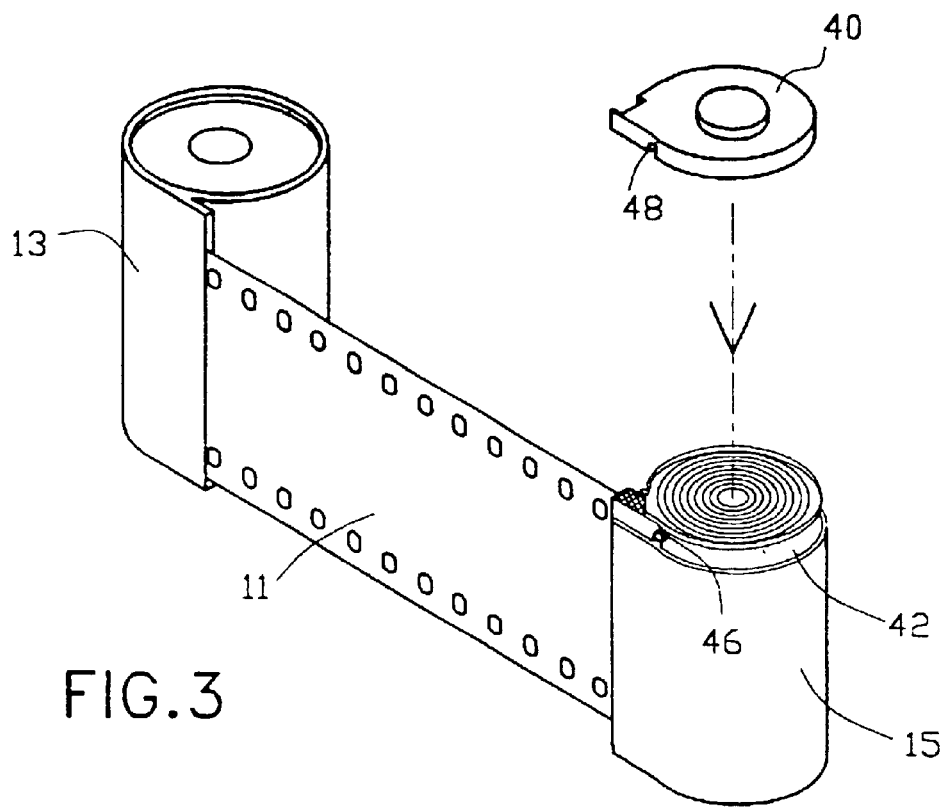
FIG. 3 shows the fitting of an end cap onto the second film container.
Figure 4:
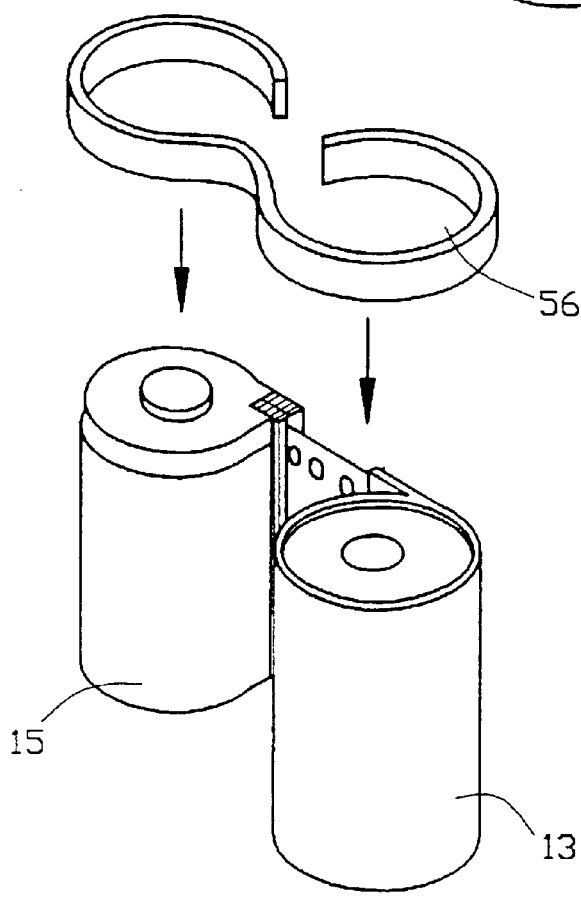
FIG. 4 shows the fitting of a clip onto the assembly.
Figure 5:
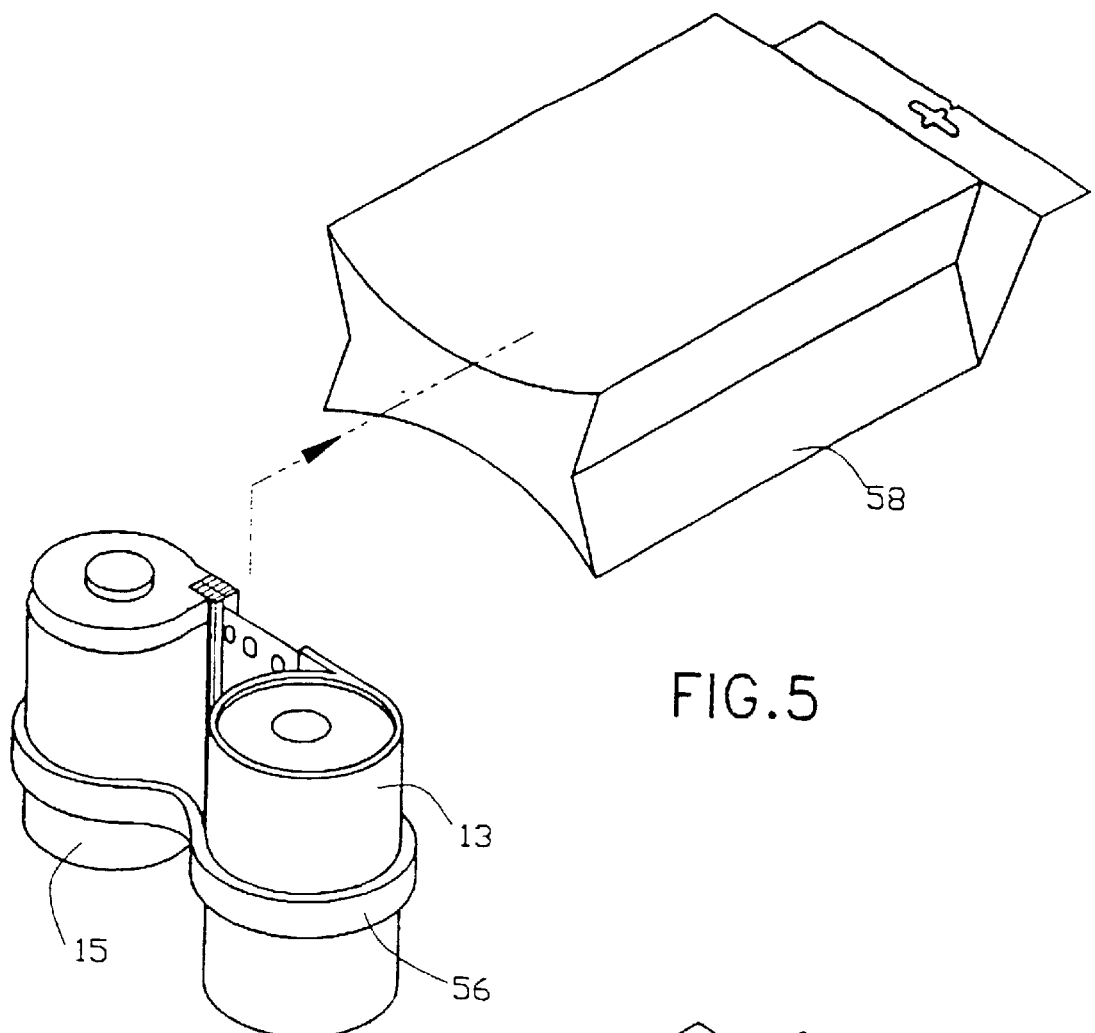
FIG. 5 shows the insertion of the assembly of film containers into an air-tight package.
Figure 6:
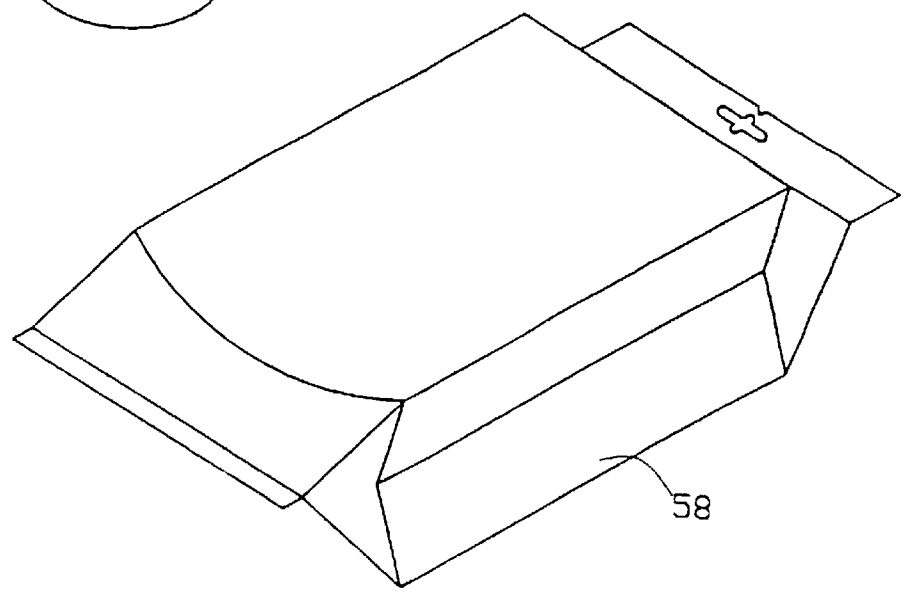
FIG. 6 shows the package when sealed.

In contrast to conventional single-use cameras where the film is pre-wound onto a rotatable spool disposed in the second film receiving chamber 14, according to the present invention the film is wound into a second film container 15. As is best seen in FIG. 3 the second film container 15 is of a similar general shape to a conventional film cassette, but in contrast thereto has no spool and is sealed at one end whilst at the other end includes a removable cap 40. The end of the container 15 includes a short region of reduced diameter 42 whereby the cap may be push-fitted onto the top of the container 15 in a light-tight manner. The container 15 includes a film slot 44 through which the film can extend which is preferably provided with some light-sealing means such as opposed strips of velvet or similar soft material as is used in a conventional film cassette. The film container 15 may also be provided with one or more lugs or pins 46 which are received in corresponding grooves or recesses 48 in order to assist in retention of the cap 40 on the container 15.

It is also preferably arranged that the film container 15 is not of identical size or shape to a conventional film cassette, for example it may be somewhat smaller than a conventional cassette, in order to ensure that the user does not try to fit the cassette 13 and container 15 in the wrong film chambers in the camera.

With single-use cameras it is usual to pre-wind the film out of the conventional film cassette and into the film-receiving chamber 14 on the opposite side of the camera prior to use of the camera, so that as the user sequentially takes pictures the film is successfully wound back into the film cassette 13. Then, once all the film is wound back into the film cassette 13 the camera can be opened in daylight or otherwise and the film cassette 13 removed for processing.

Figure 2:
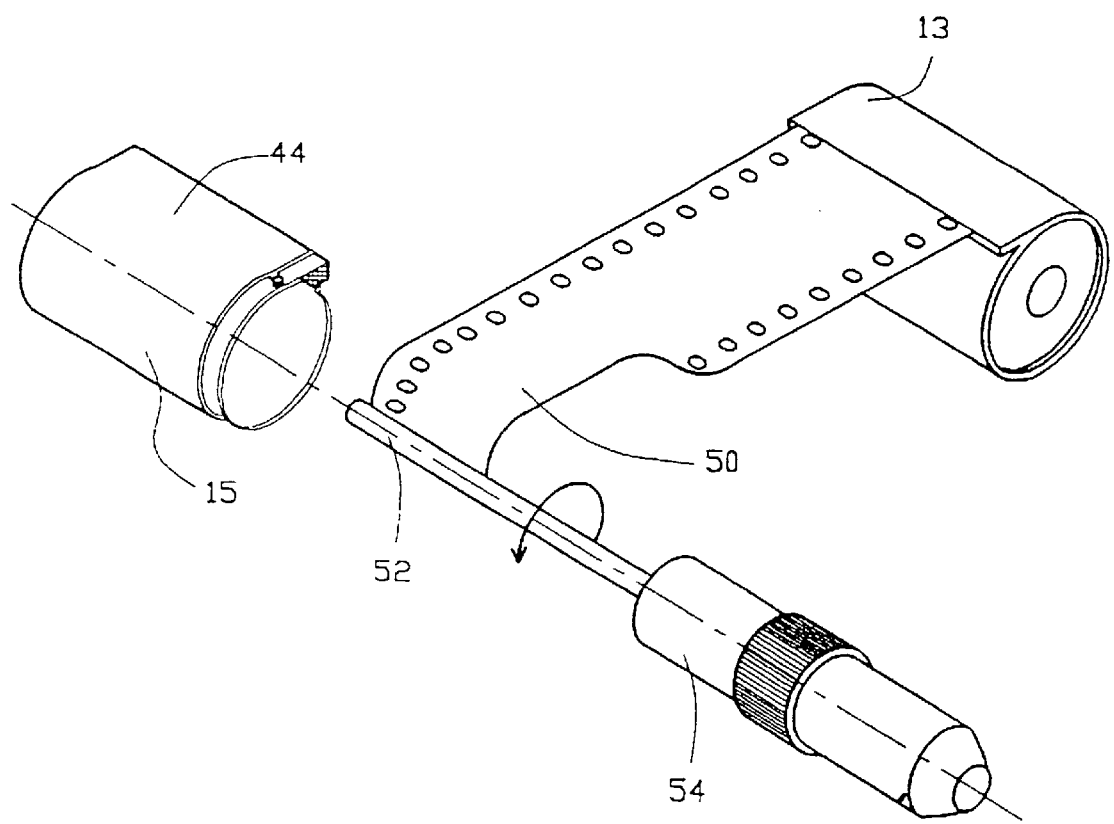
FIG. 2 illustrates the winding of the film out of a first film cassette or container into a second film container.

According to the embodiment of the present invention, the provision of the second film container 15 allows the film to be pre-wound out of the cassette 13 and into the container 15. As shown in FIG. 2, the film is wound out of the film cassette 13 by attaching a leading end 50 to end 52 of a film-winding tool 54. Such tools are well-known in the art, having a motor which rotates the tool end and provided with a ratchet arrangement whereby the drive is disconnected when the tension thereon exceeds a certain amount, to thereby prevent film damage when the end of the film is reached. In a dark environment, the film-winding tool 54 is then rotated to withdraw the film from the film cassette 13, and when the film has been fully unwound therefrom the end of the film-winding tool with the film wound thereabout is inserted into the open end of the film container 15 with the film protruding through the slot 44. Still in the dark, the cap 40 is fitted onto the end of the film container 15 whereby the roll of film is enclosed in a light-tight environment.

The film assembly comprising the pair of film containers 13 and 15 with film may now be loaded in daylight into an empty camera. In the case of loading of a new camera such loading is carried out by the manufacturer at the factory.

In an alternative method, the film may be wound directly into the second film container 15; here, the leading end 50 of the film is attached to the end 52 of the film-winding tool 54 and the end of the tool inserted into the container 15 so that the film extends through the slot 44. Then, in a dark environment the tool 54 is rotated to wind the film out of the cassette 13 and into the container 15. Once the film is fully unwound from the cassette 13 the tool 54 is withdrawn, leaving the film wound inside, and the cap 40 is fitted thereon.

The assembly of the first and second film containers and film may also be supplied to an end user to allow the user to re-load the camera. In this case it is advantageous to provide the assembly with a clip 56 in the form of a piece of bent resilient or springy plastics or metal formed into two essentially part-circular sections which are of a slightly smaller diameter than the respective film containers 13 and 15 so that they can fit tightly thereover. The clip 56 allows the containers to be held relatively securely at a fixed position relative to each other. The assembly is placed in a light-tight and air-tight package 58 which serves to protect the assembly from damage, dust, dirt, light and humidity which might otherwise serve to degrade the film before it is sold to the user. Such packages are commonly formed of plastics materials and may be multi-layer materials which may also include a metallized layer. The clip 56 also serves to protect the film and means that there is no pressure exerted on the film by the relative movement of the containers which could otherwise tear or damage the film if the package is mishandled.

Figure 13:
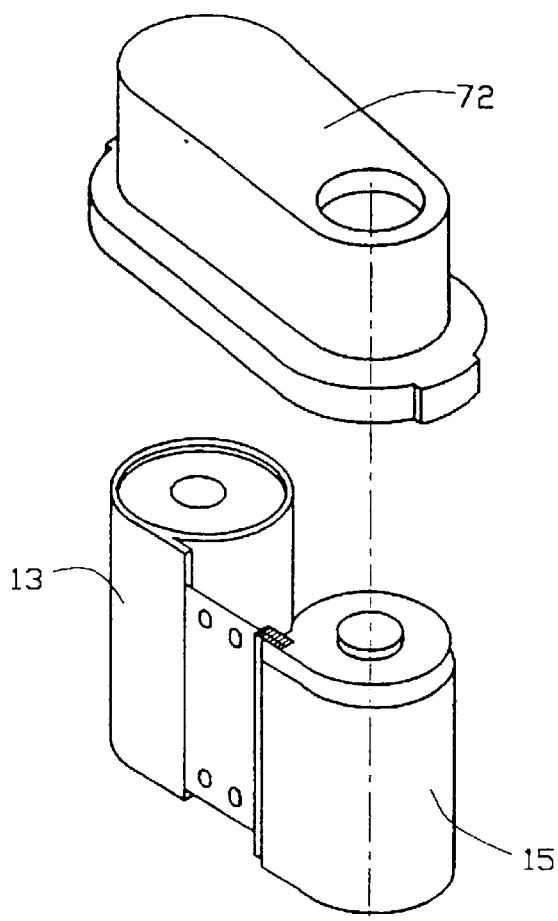
FIG. 13 shows the insertion of the film assembly into a protective canister.
Figure 14:
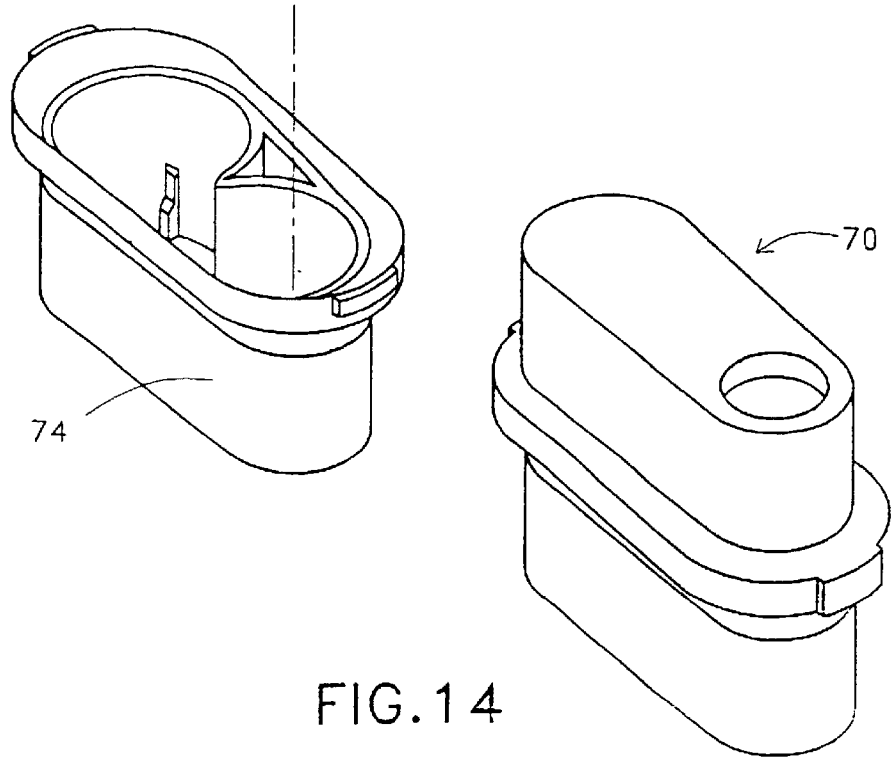
FIG. 14 shows the canister when closed.

As an alternative to the use of a clip and a sealed package, an outer housing or canister 70 could be provided as shown in FIGS. 13 and 14 which is adapted to hold the cassette 13 and container 15 relatively securely and in a fixed relative orientation. The canister 70 has upper and lower parts 72, 74 which can be push-fitted together, defining chambers for receiving and holding the cassette 13 and container 15.

FIGS. 7 to 11 illustrates the sequence of steps to be followed by a user in re-loading the camera with fresh film. The first step is the opening of the camera back by sliding the latches 26 to the right and levering off the opposite edges of the back cover 8 so that the aperture 27 clears the protrusions 25.

Figure 8:
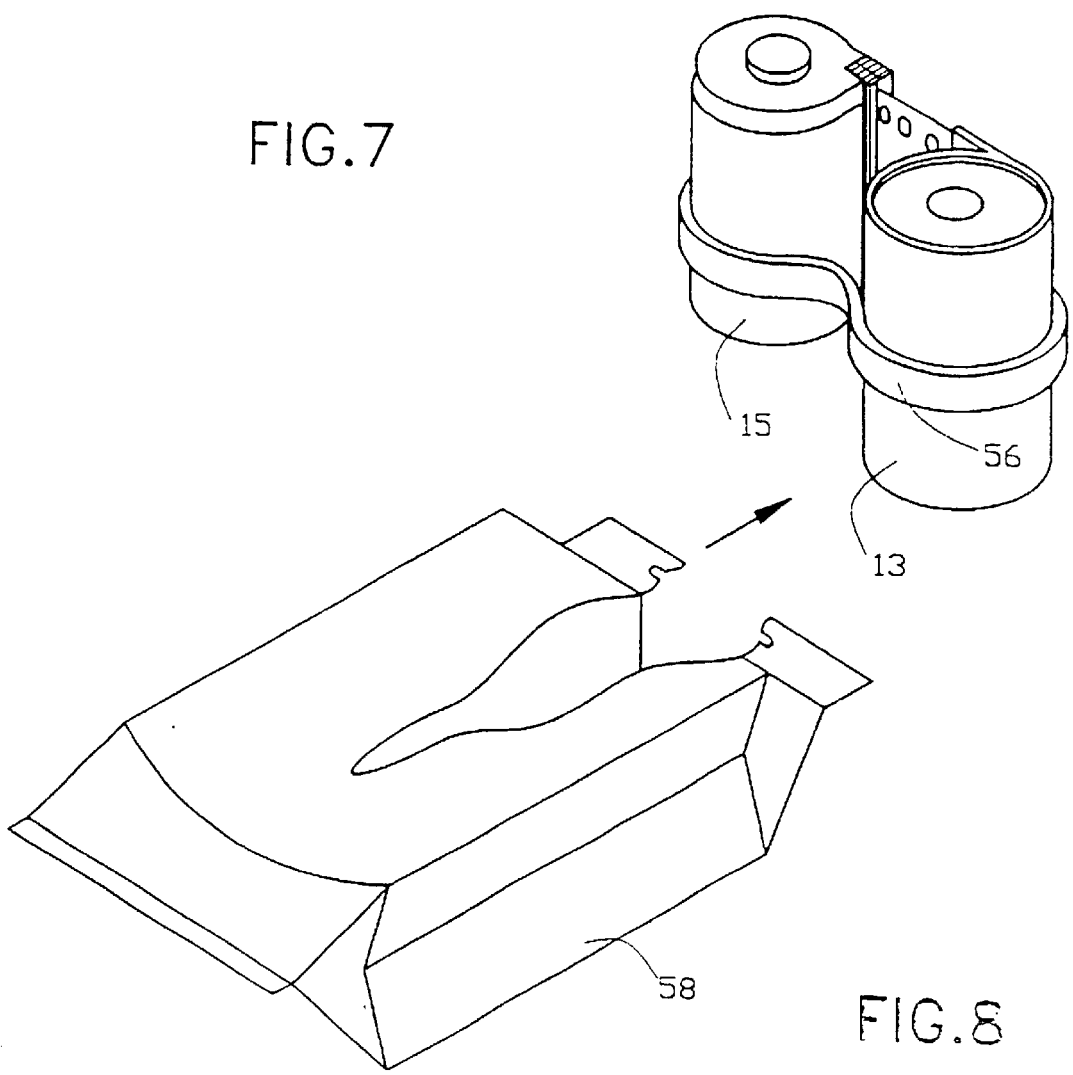
FIG. 8 illustrates the opening of the package and removal of the assembly of film containers.

As indicated in FIG. 8, the package 58 is torn or cut open and the assembly of film containers 13, 15 and film with the clip 56 fitted thereto is removed from the package 58.

Figure 9:
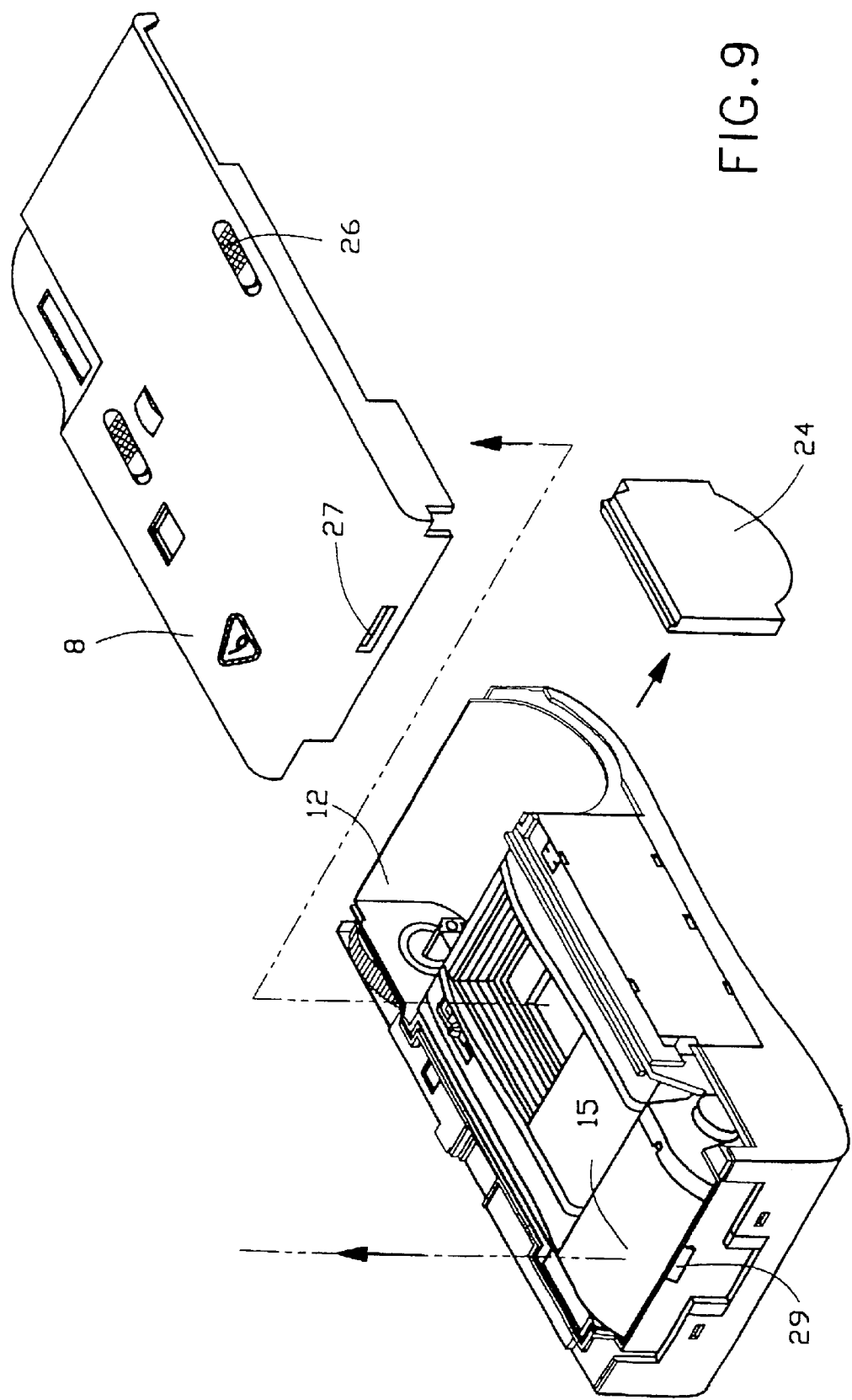
FIG. 9 illustrates the removal of the old film container from the camera prior to re-loading.

FIG. 9 shows the back cover 8 being removed. The plate 24 is also removed from the lower end of the chamber 12. The old film container 15' left from the previous use of the camera is also removed and discarded. The user then removes the clip 56 from the pair of containers 13, 15 and draws these apart so that they are an appropriate distance to be fitted into the respective chambers 12, 14 as indicated in FIG. 1. The plate 24 is then fitted to the lower end of the chamber 12 and the back cover 8 is fitted by push-fitting the edges of the back cover over the protrusions 25 and moving the latches 26 to the left-most position.

Figure 10:
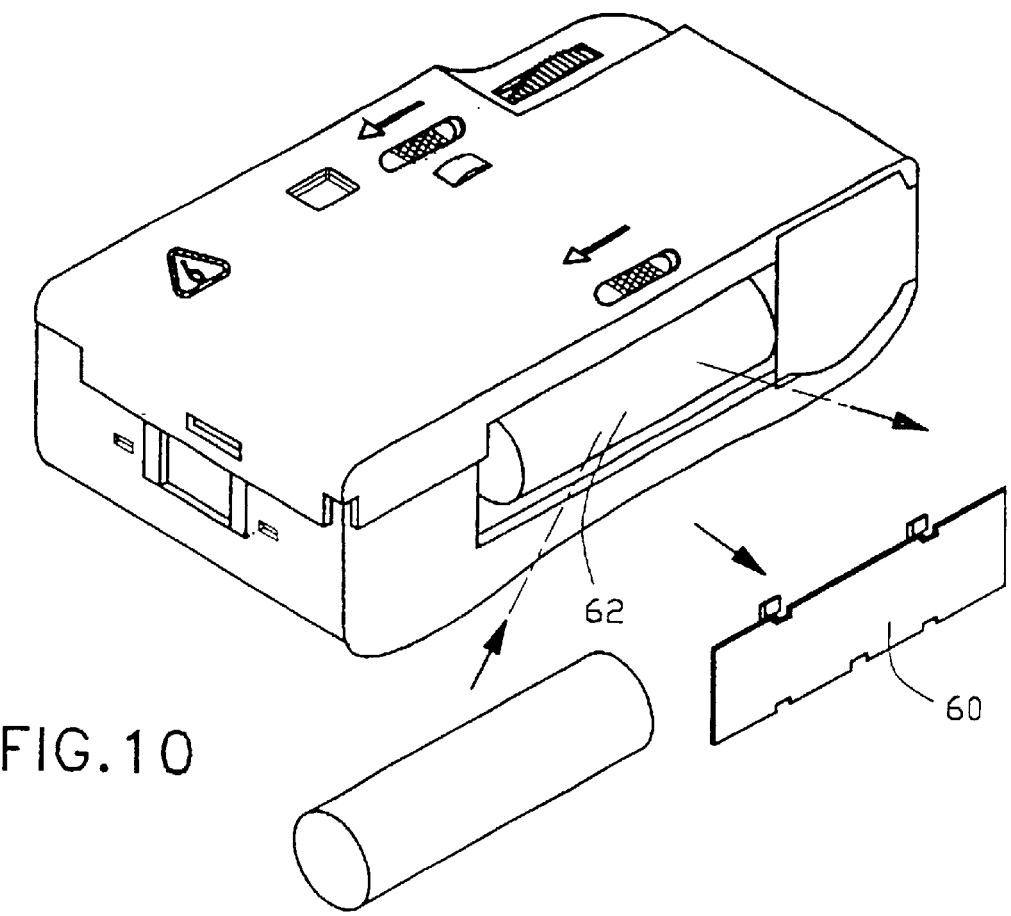
FIG. 10 illustrates the changing of the battery prior to re-use.

The user may also check the flash battery 62; if the flash still charges quickly then no battery change may be necessary, but if charging is slow then the user may also replace the battery 62 as indicated in FIG. 10.

Figure 11:
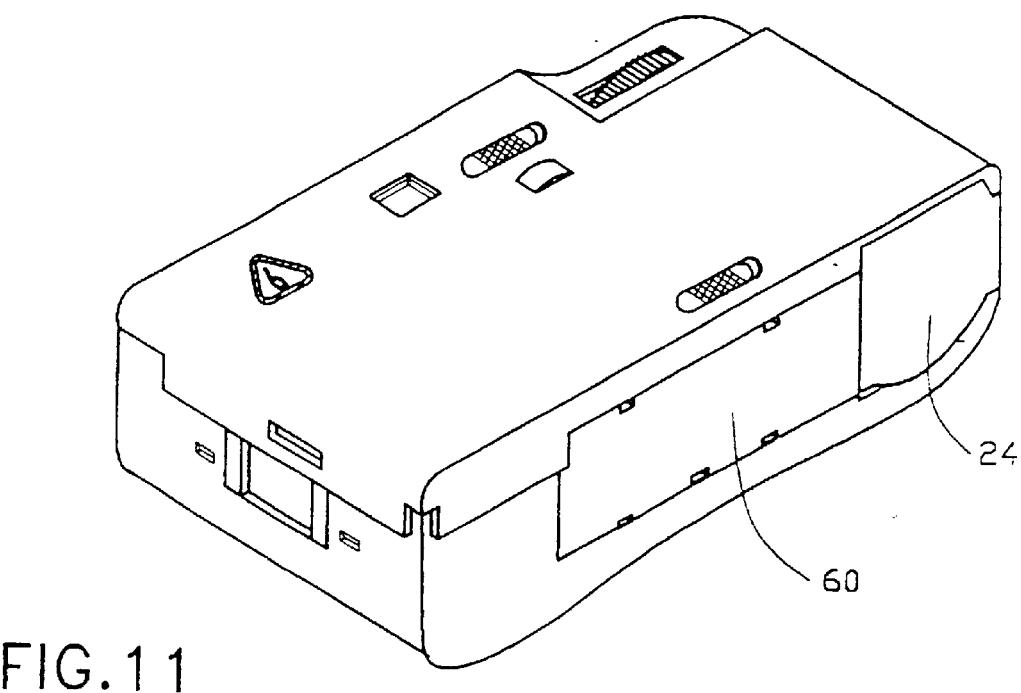
FIG. 11 shows the camera with the battery door re-fitted.

FIG. 11 shows the battery cover 60 re-fitted.

Figure 12:
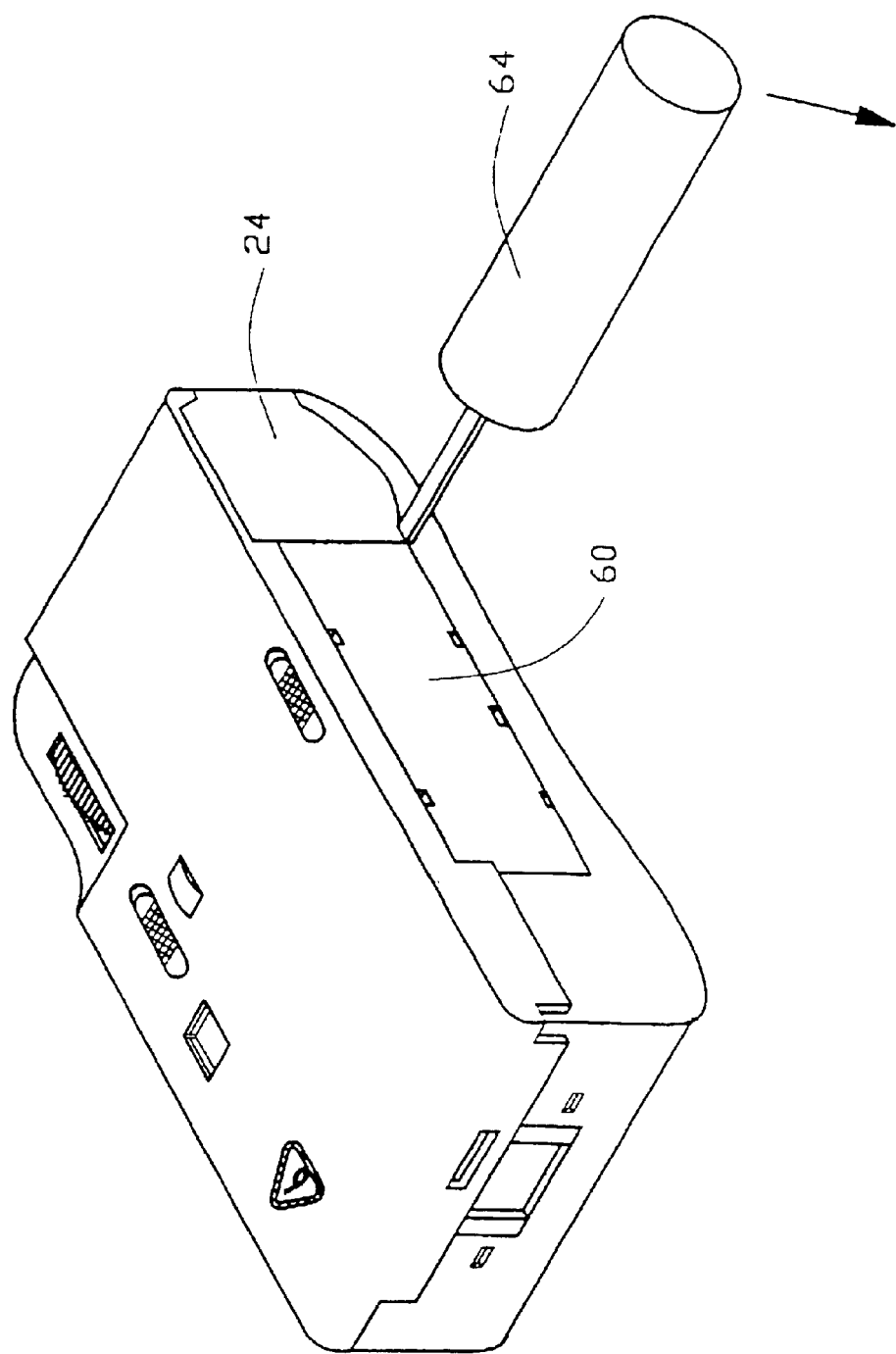
FIG. 12 illustrates the procedure of removing a bottom plate in order to remove an exposed film.

FIG. 12 shows the manner in which the cover 24 is removed from the camera after the film has been exposed using for example a tool having a pointed end, such as a screwdriver 64 or similar to engage beneath an edge of the plate 24 to lever it off the camera body.

The above-described film assemblies and loading method are applicable to use of conventional black and white or colour film, but equally applicable to the use of film which has pre-exposed latent images thereon, such as is described in applicant's U.S. application Ser. No. 08/846,901. This film may have a portion or portions such as for example a single edge region of the film or a border region pre-exposed with a latent image such as a decorative image or a message, which thereby appears in the finished photograph. A suitable camera for use in exposing such film has a mask of appropriate shape to mask out the pre-exposed region of film, so that this region does not receive a double exposure.

Figure 15:
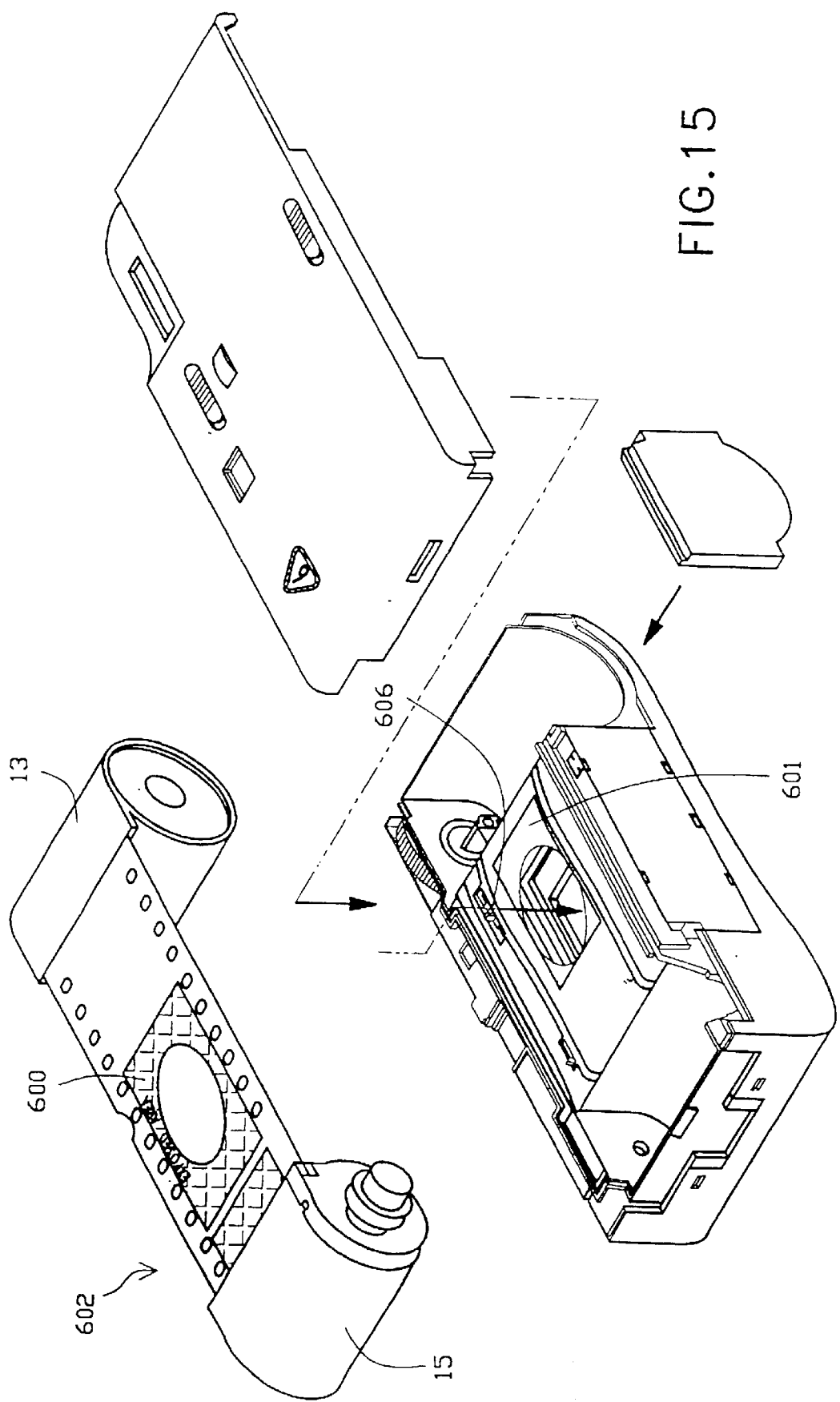
FIG. 15 shows the use of a film having a pre-exposed latent image.

FIG. 15 shows a film assembly 602 which is provided with film having a pre-exposed border region, schematically indicated 600. The camera includes suitable masking means 601 so that only the central oval region of film is exposed by the user. With this film it is important that the pre-exposed image is appropriately positioned with respect to the exposure window to ensure correct alignment of the user-exposed image and for this purpose the film has an alignment notch 604 or indicia, whilst the camera has an alignment mark 606 adjacent the film guides. On insertion of the assembly 602 into the camera the user or loader must ensure the notch 604 is aligned with the marking 606. The film may have a pre-exposed region of a different shape, for example a pre-exposed strip along the bottom (in the finished photograph) of the frame is popular. In this case the camera is required to have a corresponding strip-shaped mask.

Figure 19:
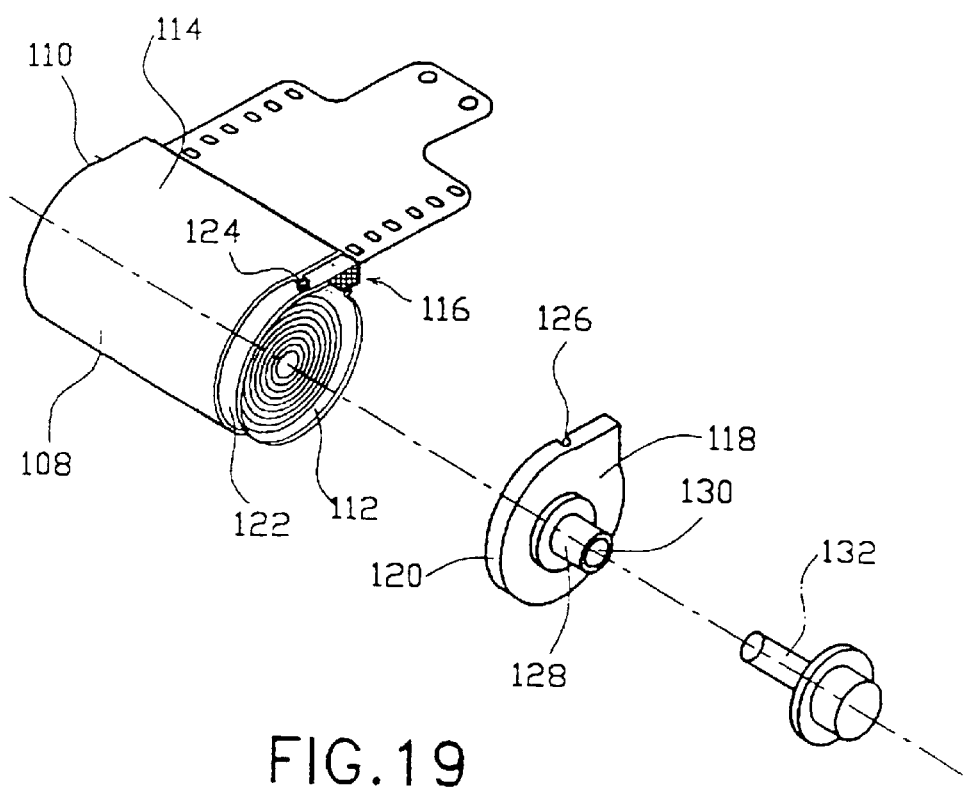
FIG. 19 shows the final step of assembly of the film container.
Figure 20:
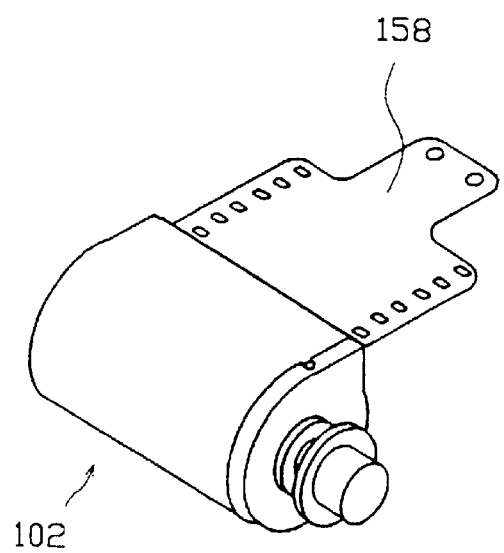
FIG. 20 shows the assembled film container.
Figure 22:
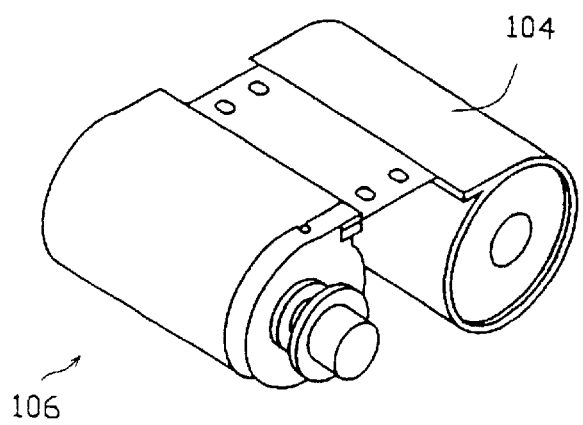
FIG. 22 shows the finished film assembly.
Figure 23:
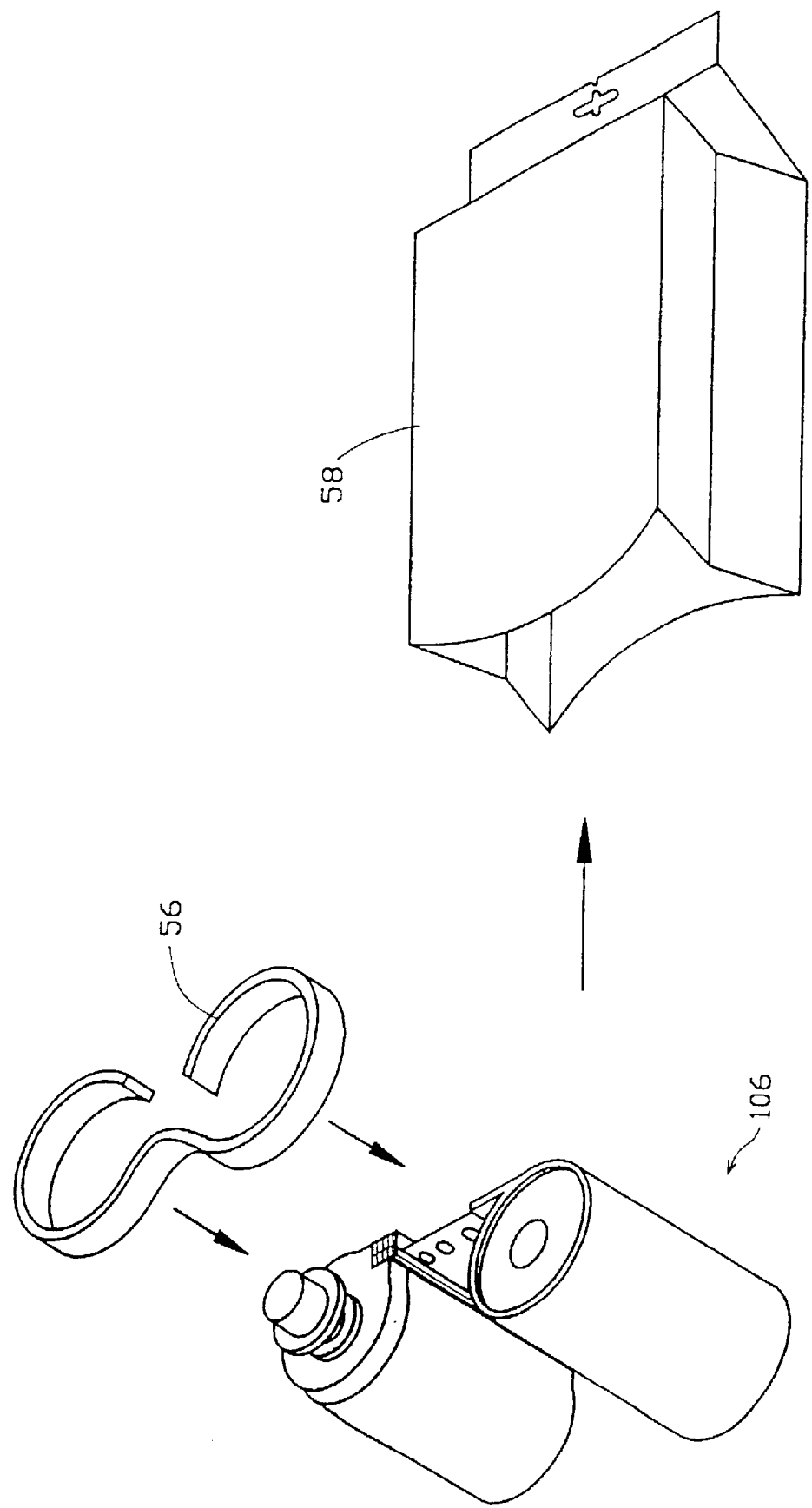
FIG. 23 shows the step of securing the film assembly with a clip and sealing this into a package.
Figure 24:
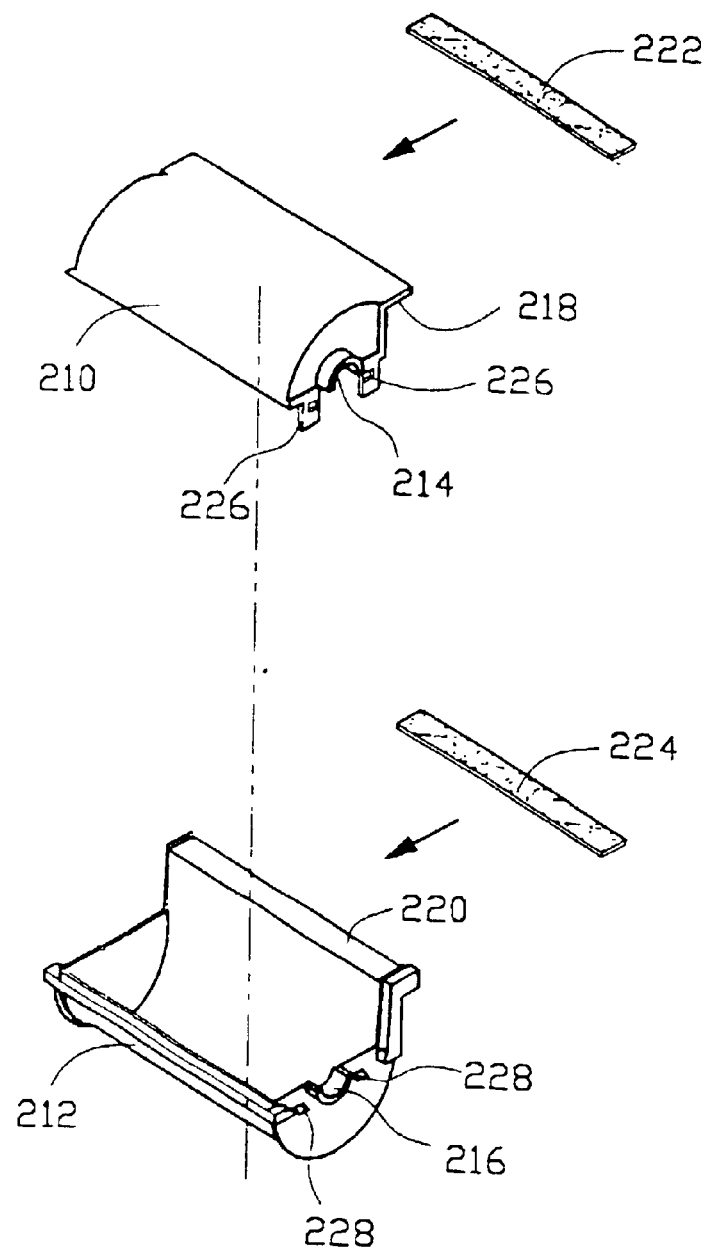
FIG. 24 illustrates a film container for use in a method of film loading in accordance with a further embodiment of the invention.

Referring now to FIGS. 19 and 20, these show an alternative form of film container 102, which in combination with a conventional film cassette or patrone 104 is used to produce a film assembly or package 106 as shown assembled in FIG. 22. The container 102 comprises a generally cylindrical or cup-like spoolless housing 108 closed at one end 110 and open at the opposite end 112. At a region of the sidewall of the housing 108 there is a flattened portion 114 which defines adjacent thereto an elongate film slot 116 which is preferably lined by a soft fabric-like material such as velvet or similar in order to ensure that the slot is both light-tight whilst also providing soft non-scratching surfaces for the passage of a length of film therethrough. At the open end 112 the housing 108 is closed by an end cover or cap 118. The cap 118 comprises a generally flat face with a depending flange 120. At the open end the housing 108 is provided with a portion 122 of reduced diameter over which the flange 120 fits in a push-fit manner. The reduced diameter portion 122 may also be provided with a number of projections 124, with the end cap provided with corresponding openings or recesses 126 which serve to hold the cap 118 on the end of the housing 108. The cap 118 is also provided with an upstanding collar 128 defining an aperture 130 therethrough. A separate plug part 132 is provided in order to seal the aperture 130.

Figure 16:
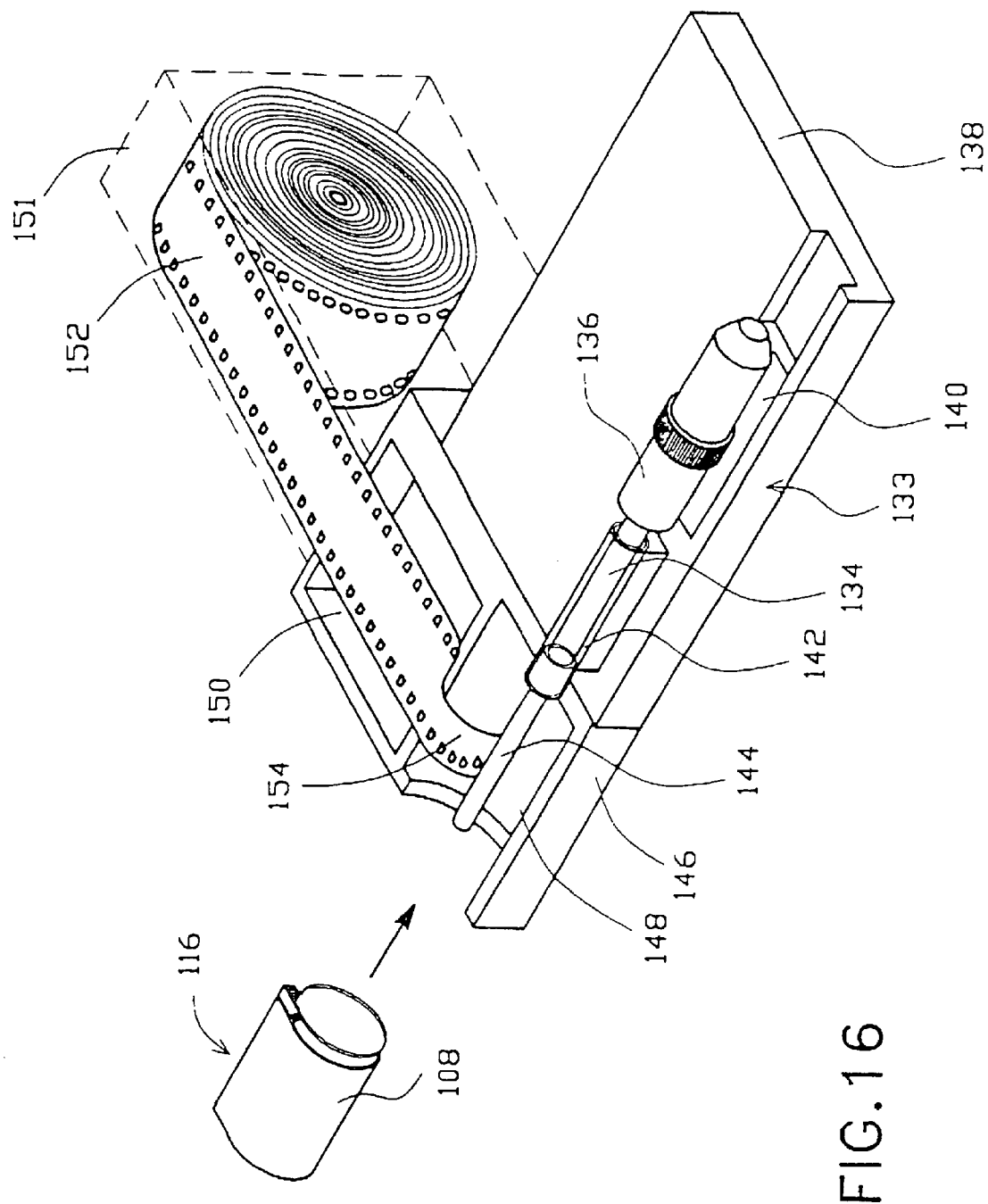
FIG. 16 shows the first step of loading film into a film container, in accordance with an alternative method.

Turning now to FIG. 16 there is illustrated an apparatus for film loading including a film winding apparatus 133 comprising an electric motor 136 supported on a base 138 by means of a slide 140, and carrying a film winding tool 134. The film winding tool 134 extends through an elongate support sleeve 142. At its end the tool 134 is provided with an axially extending split region 144. Adjacent the winding apparatus is a jig 146 which includes a recessed region 148 for receiving a film container and a cutting recess 150.

The first stage of the method involves the provision of a bulk roll or "pancake" of film 152. The bulk roll of film 152 is housed in a light-tight housing 151 shown in dotted lines, the film exiting through a slot in a light tight manner. The housing 151 is omitted from subsequent drawings for reasons of clarity. The leading end 154 of the bulk roll of film is secured within the split end 144 of the tool 134, the housing 108 of the film container 102 is inserted so that the leading end 154 of film passes through the slot 116 of the housing 108 until the full width of film is received within the housing 108.

Figure 17:
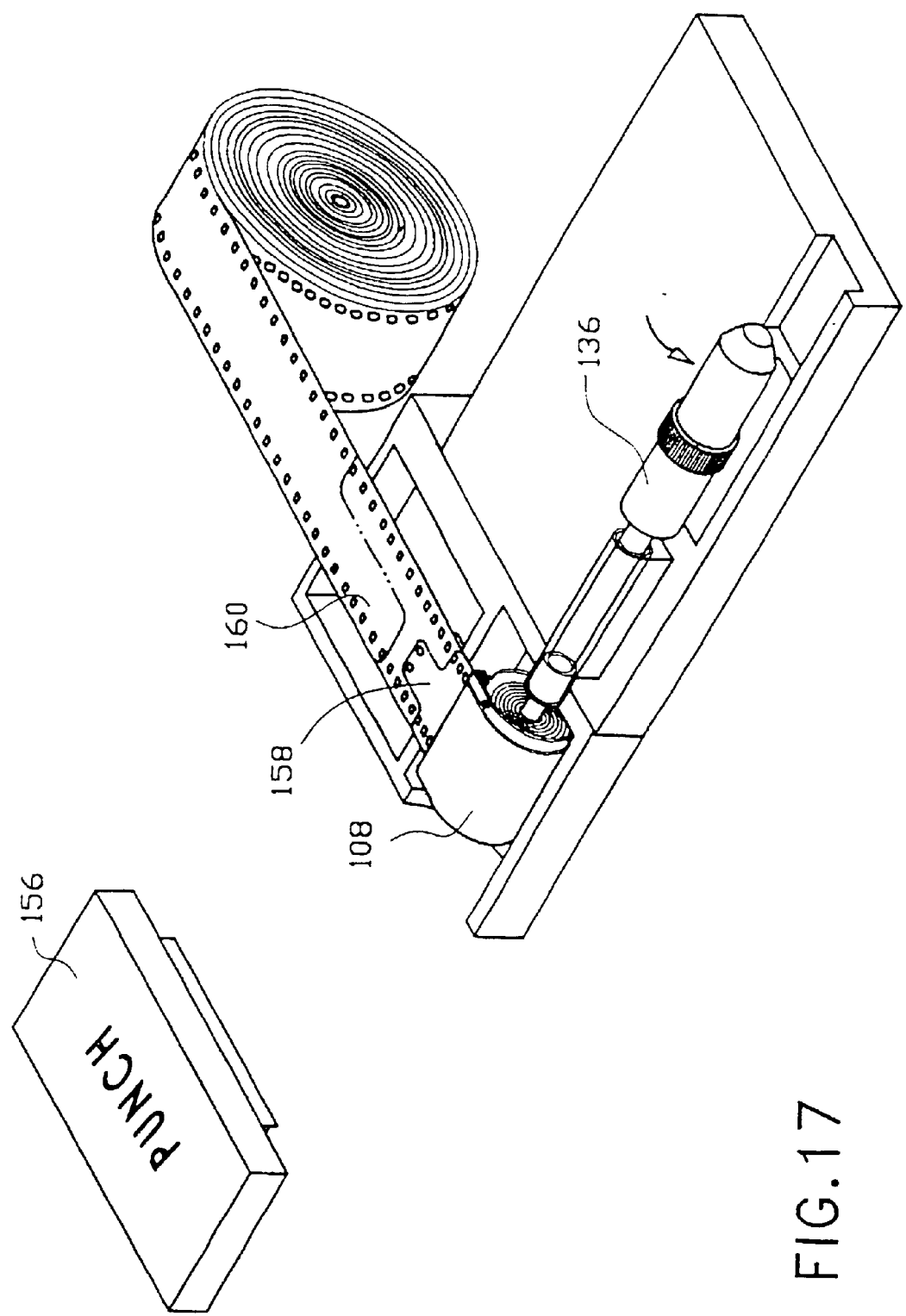
FIG. 17 shows the step of cutting a length of film which has been wound into a housing of the film container.
Figure 18:
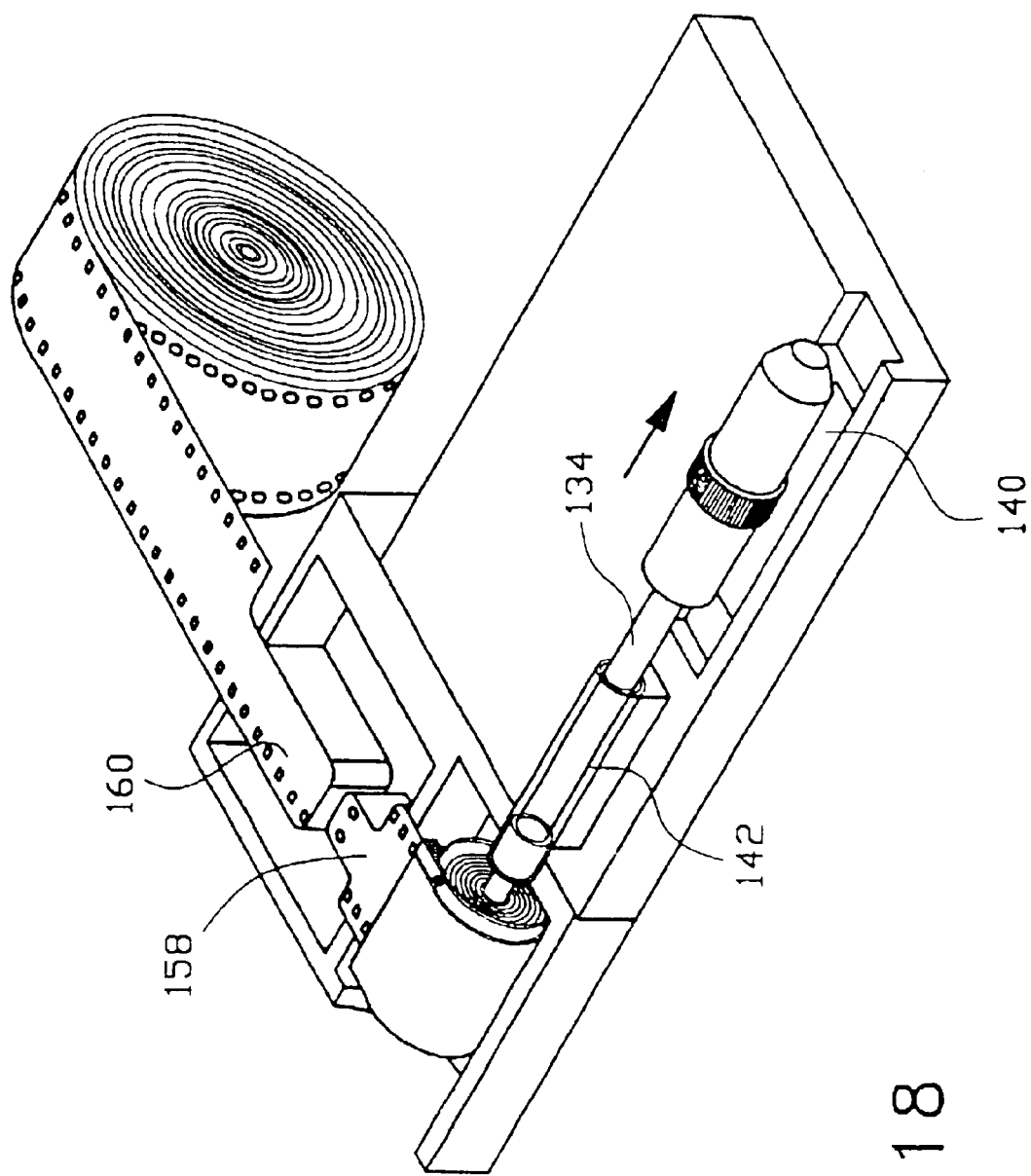
FIG. 18 shows the film after cutting and shows withdrawal of a film winding tool.

As indicated in FIG. 17 the motor 136 is then operated to wind the film into the housing 108. It will usually be arranged that the length of film is sufficient to provide 24 or 36 35 mm exposures contained within the housing 108. The film is then cut by a punch 156 which serves to cut the trailing edge of the film wound into the housing 8 into a short tongue-shaped portion 158, and the new leading end of film roll into a portion of reduced width 160 as indicated in FIG. 18. Tool 134 is then retracted by moving the slide 140 away from the sleeve 142, and the end cap 118 and plug 132 fitted as indicated in FIG. 19 to produce the film container 102 as indicated in FIG. 20.

Figure 21:
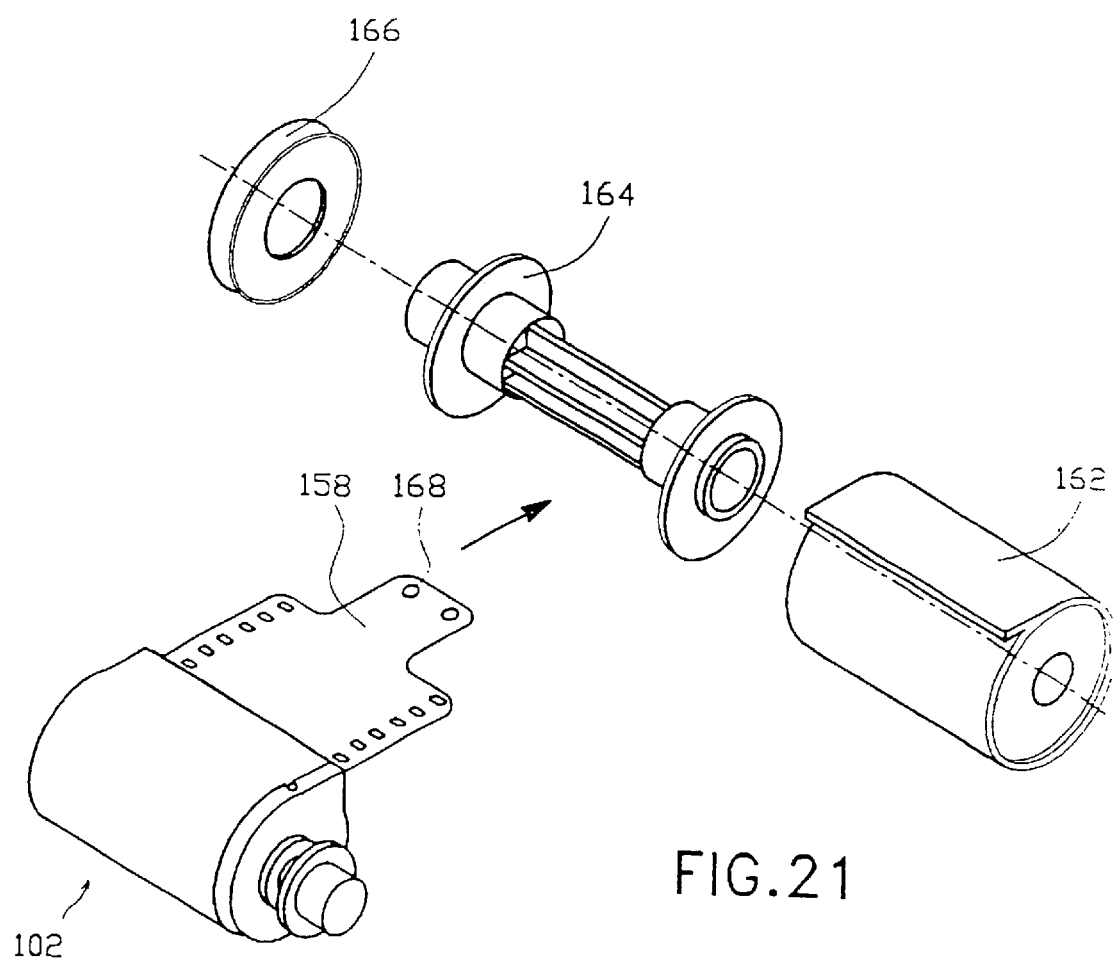
FIG. 21 shows the step of attaching an end of the film to a conventional film cassette.

As shown in FIG. 21 the conventional film patrone 104 comprises an outer housing 162, a spool 164 and a securing ring 166. The spool 164 is provided with an axially extending slot to receive the tongue 158 of the film. Adjacent the slot there are provided a pair of projections which engage the two holes 168 of the tongue 158, as is conventional, to thereby reliably hold the end of the film on the spool 164. Spool 164 with the film attached is then inserted into the container housing 162 so that the film extends through the film slot thereof, and the ring 164 is then fitted to close the patrone.

The assembly 106 as indicated in FIG. 22 may then be placed at the factory directly into a new camera, for sale to a user. Alternatively, the assembly 106 may be packaged for sale to a user who may themselves re-load their camera with the assembly 106. The loading of the camera is as discussed above in relation to FIGS. 1 and 7 to 11.

Where the assembly 106 is packaged for sale to a user for reloading it is likewise advantageous to provide the assembly with a clip 56 as discussed above in the form of a piece of bent resilient or springy plastics or metal formed into two essentially part-circular sections which are of a slightly smaller diameter than the respective film container 102 and patrone 104 so that they can fit tightly thereover. The clip 56 allows the container and patrone to be held relatively securely at a fixed position relative to each other. The assembly is placed in the light-tight and air-tight package 58 which serves to protect the assembly from damage, dust, dirt, light and humidity which might otherwise serve to degrade the film before it is sold to the user. Such packages are commonly formed of plastics materials and may be multi-layer materials which may also include a metallized layer. The clip 56 also serves to protect the film and means that there is no pressure exerted on the film by the relative movement of the container and patrone which could otherwise tear or damage the film if the package is mishandled.

A further embodiment of the invention is described with reference to FIGS. 24 to 31. This embodiment utilizes a spoolless film container 202 illustrated in its assembled form in FIG. 30. The film container 203 comprises a housing 208 which is formed as two housing shell halves 210 and 212. The shell halves 210, 212 co-operate to form an enclosure defining a circular aperture at one end, the opposed curved surfaces which define this aperture being indicated 214, 216. The shell halves 210, 212 also define an elongate slot between opposed ledges 218 and 220. The ledges 218, 220 are covered by strips 222 and 224 respectively of soft fabric or fabric-like material such as velvet, which may be secured by means of adhesive or double-sided tape to the ledges. One or both shell halves may be provided with lugs 226 having apertures or recesses which snap-fit with a corresponding protrusion on the opposite shell half, thereby securing the shell halves together. Alternatively, or additionally, adhesive or welding may be used.

Figure 25:
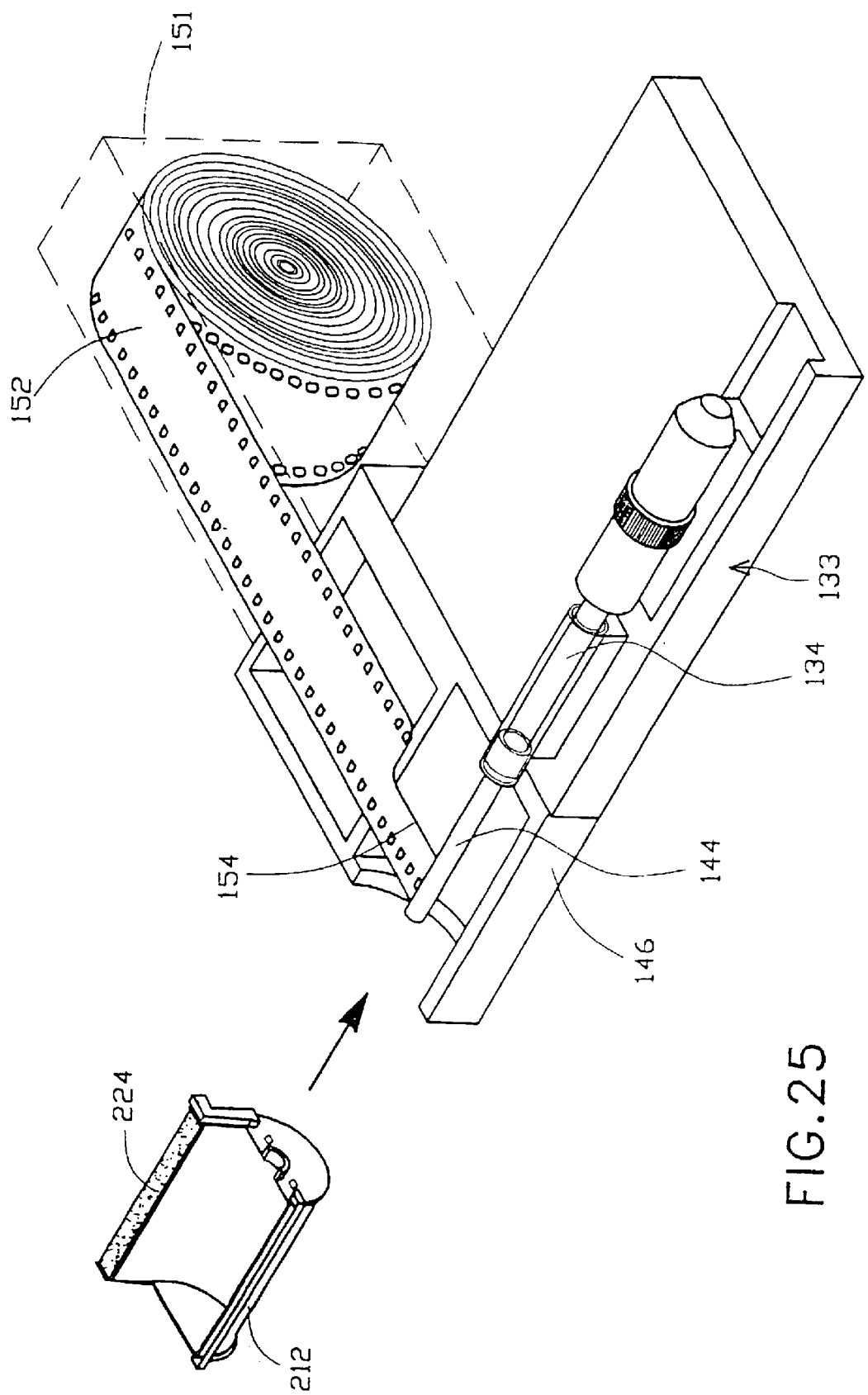
FIG. 25 illustrates the first step of the method of loading the container of FIG. 24.
Figure 26:
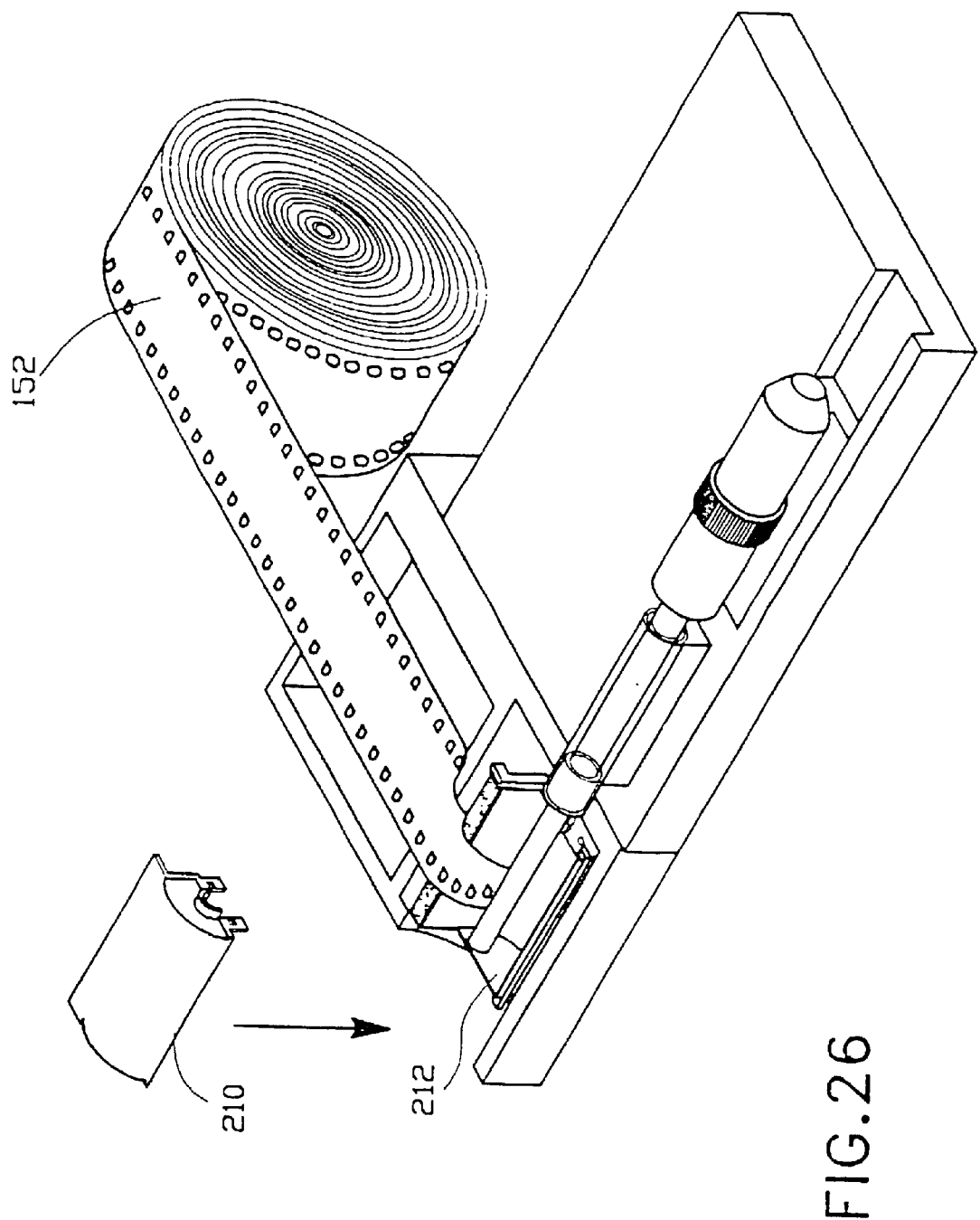
FIG. 26 illustrates the assembly of the film container about the leading end of film.
Figure 27:
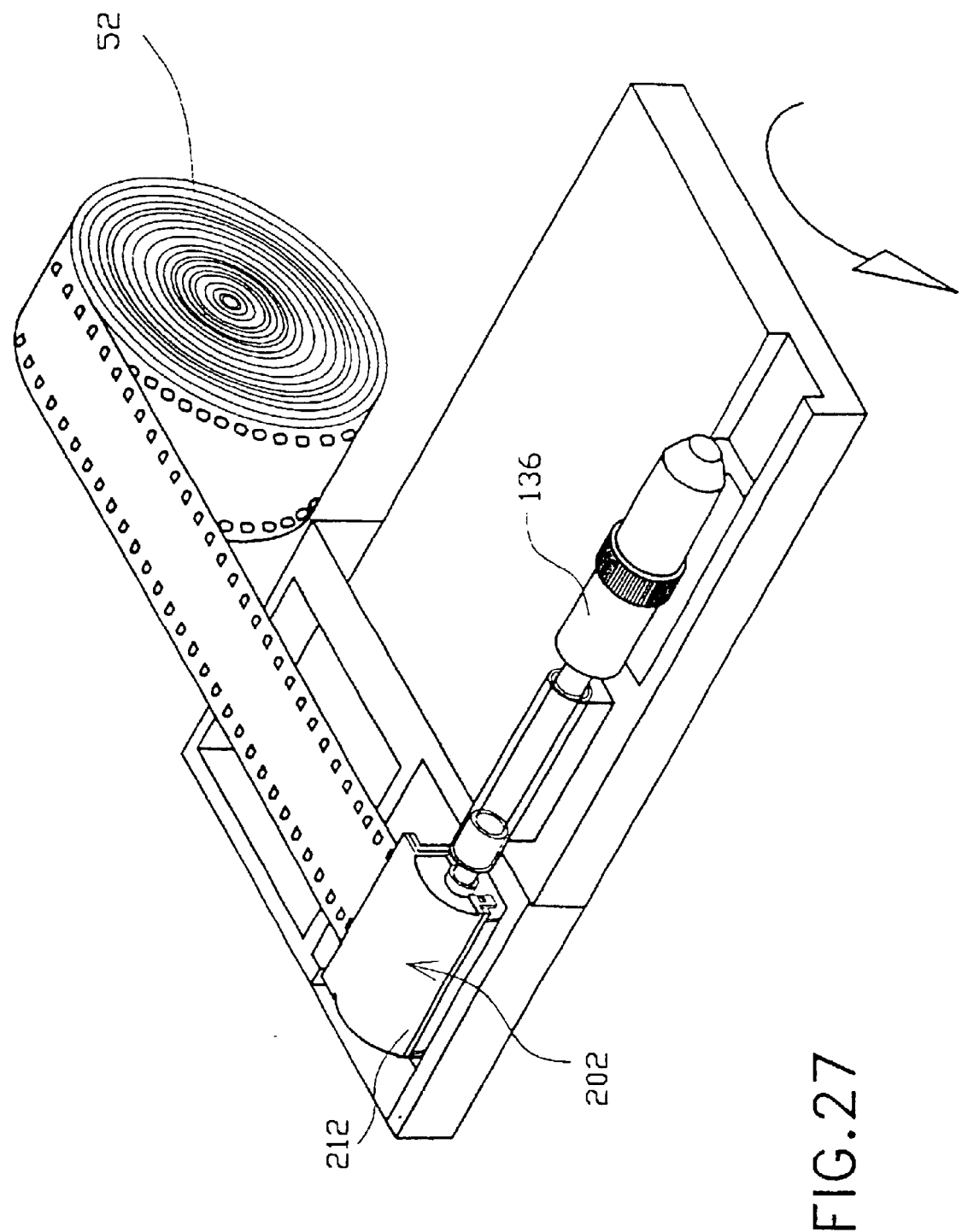
FIG. 27 illustrates the step of film winding.
Figure 28:
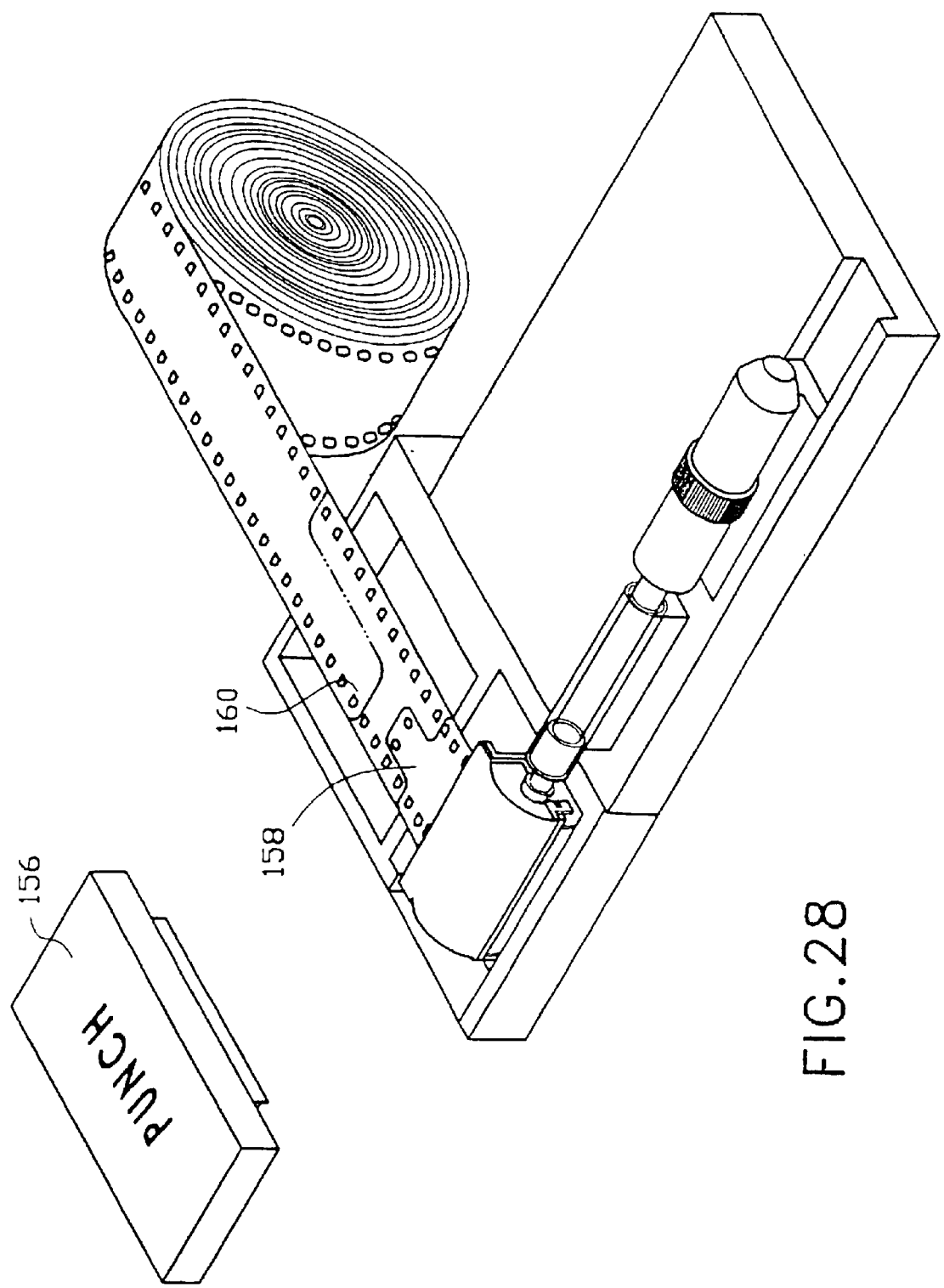
FIG. 28 illustrates the cutting of a length of film from the roll of bulk film.
Figure 29:
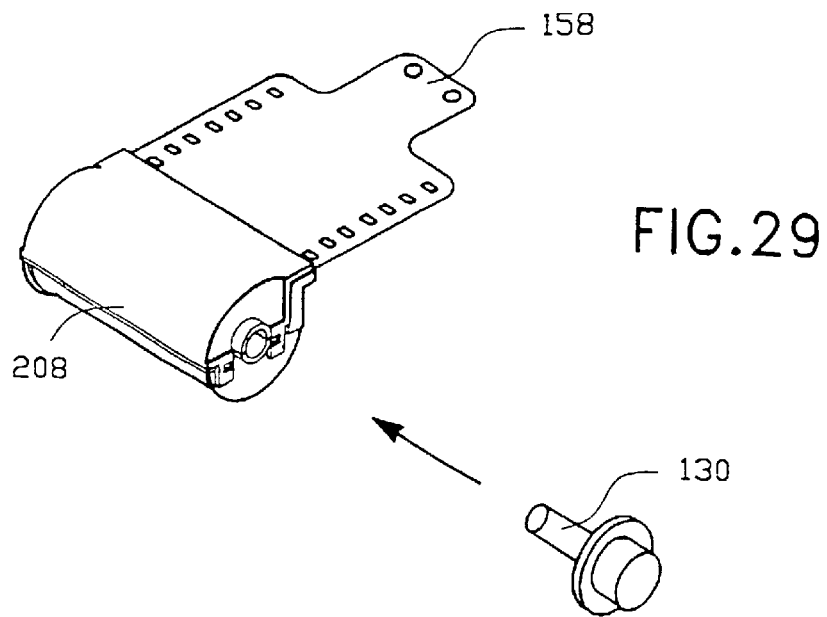
FIG. 29 illustrates the final step of the assembly of the film container.
Figure 30:
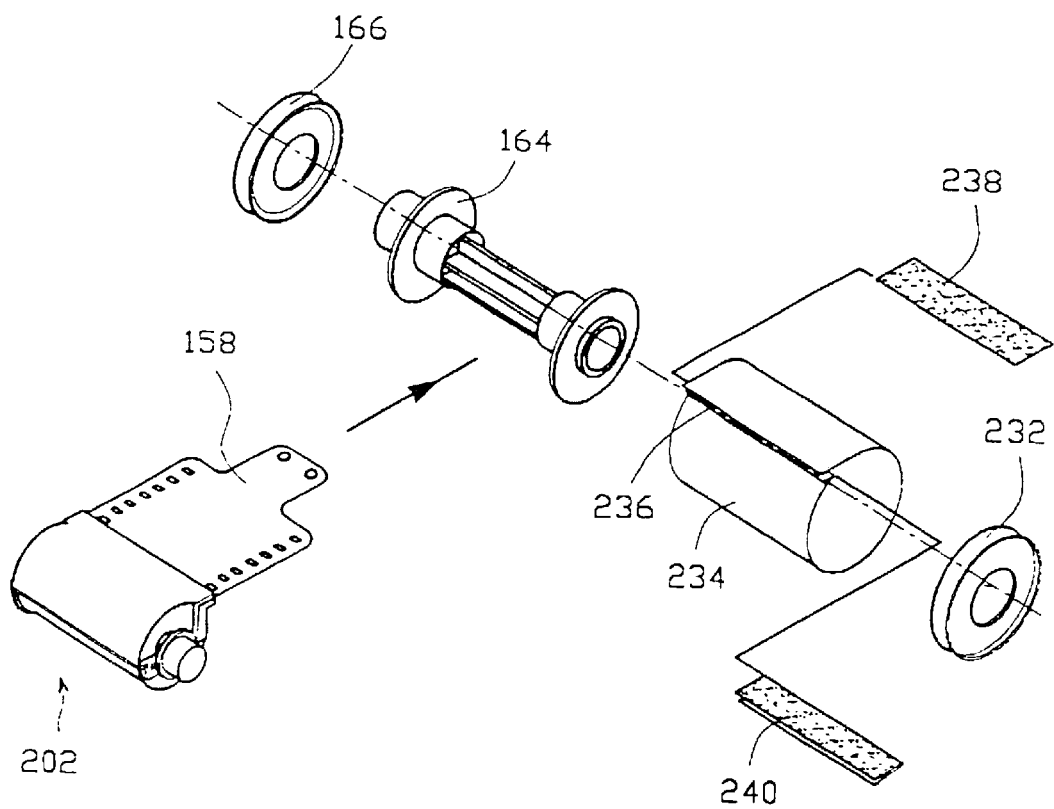
FIG. 30 shows the attachment of the film container to a conventional film patrone.

The method of film loading in the container 202 is now described. As shown in FIG. 25 an identical film winding apparatus as described above is utilized, and the construction thereof is not therefore further described, whilst like reference numerals are used to indicate like parts. In a darkroom a leading end 154 of the roll of bulk film 152 withdrawn from housing 151 is secured to the end 144 of the film winding tool 134. The lower shell half 212 is then fitted into the jig 146 beneath the tool end 144, and the other shell half 210 secured thereto as indicated in FIG. 27. The motor 136 is then operated to wind the film into the container 202 from the bulk roll of film 152 until sufficient film is wound therein to give the desired number of exposures. As indicated in FIG. 28 the punch 156 is utilized to cut the film length, leaving the film ends 158 and 160 respectively. The winding tool 134 is then retracted, the housing 208 having the film fitted therein removed and a plug 130 fitted into the aperture. FIG. 30 shows the film end 158 being secured into the conventional film patrone. The construction of this film patrone differs slightly from that illustrated and described with respect of the first embodiment in that this includes a pair of securing rings 166, 232 which fit over the housing 234. The housing 234 defines a film slot 236 having on one side a flat piece of velvet 238 and on the opposite side of the slot a piece of velvet 240 of V-shaped section which is secured over the slot and extends a small distance around the inside of the housing.

As shown in FIG. 31 the finished assembly 206 may have a clip 56 fitted thereto and be secured in a package 58.

The assembly 206 may likewise be loaded at the factory, or re-loaded by a user into a camera as described above in relation to FIGS. 1 and 7 to 11.

A further embodiment of a container and a method in accordance with the invention, as can be seen in FIGS. 34 and 35, uses a film container 302 which is generally similar to that of the previously described embodiment, but has no film-winding tool aperture. The container 302 comprises a housing 304 which is formed of two housing shell halves 310, 312 which co-operate to form an enclosure defining an elongate film slot between opposed ledges 318, 320. The ledges 318, 320 are covered by strips 322, 324 of soft fabric or fabric-like material such as velvet which may be secured by means of adhesive or double-sided tape. One or both shell halves may be provided with one or more lugs 326 having apertures or recesses therein which snap-fit over protrusions 328 on the opposite shell half, to thereby secured the shell halves together. Alternatively, or additionally, adhesive or a welding technique may be used to secure the halves together.

Figure 32:
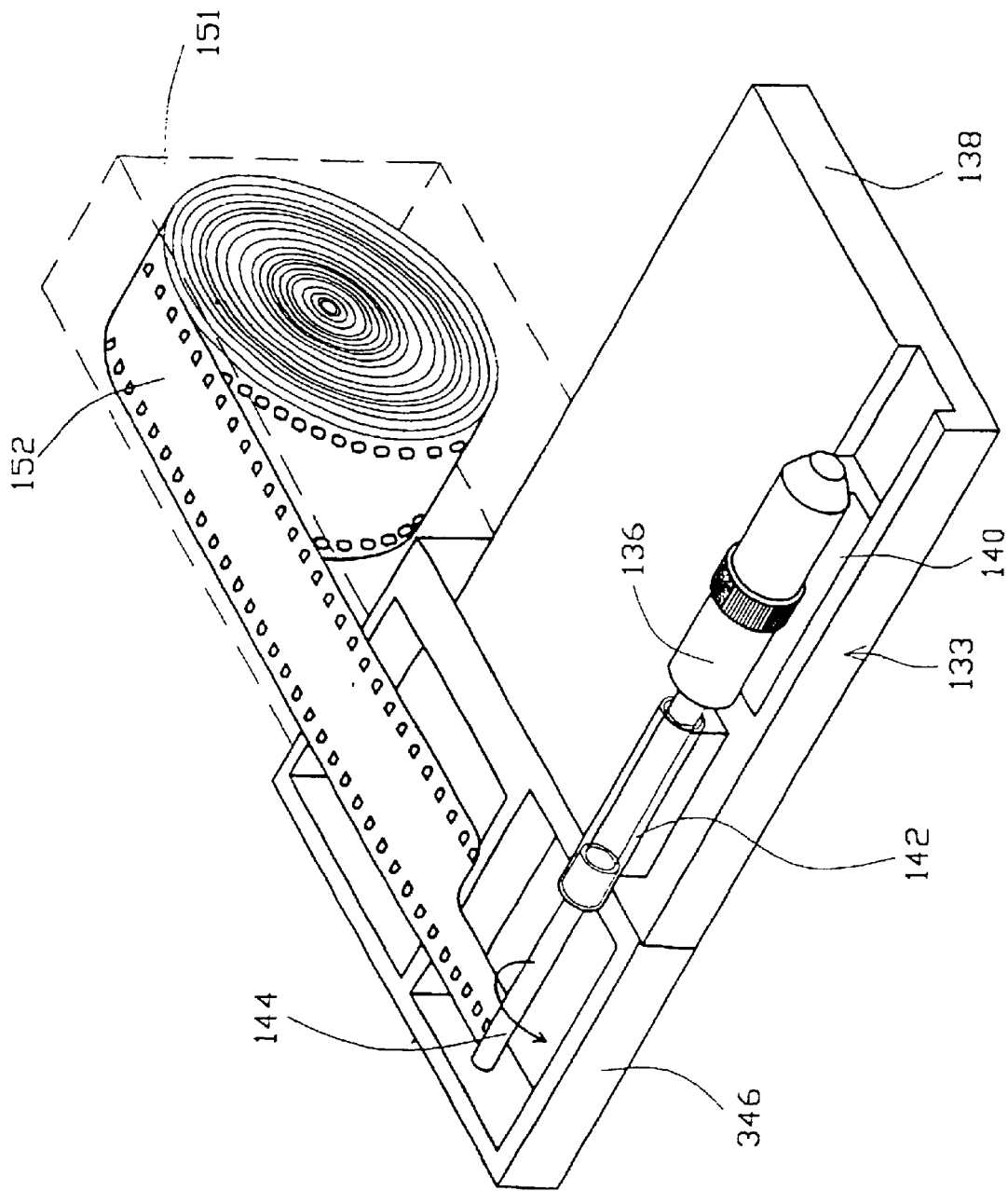
FIG. 32 illustrates the first step of a method in accordance with a still further embodiment of the invention.
Figure 33:
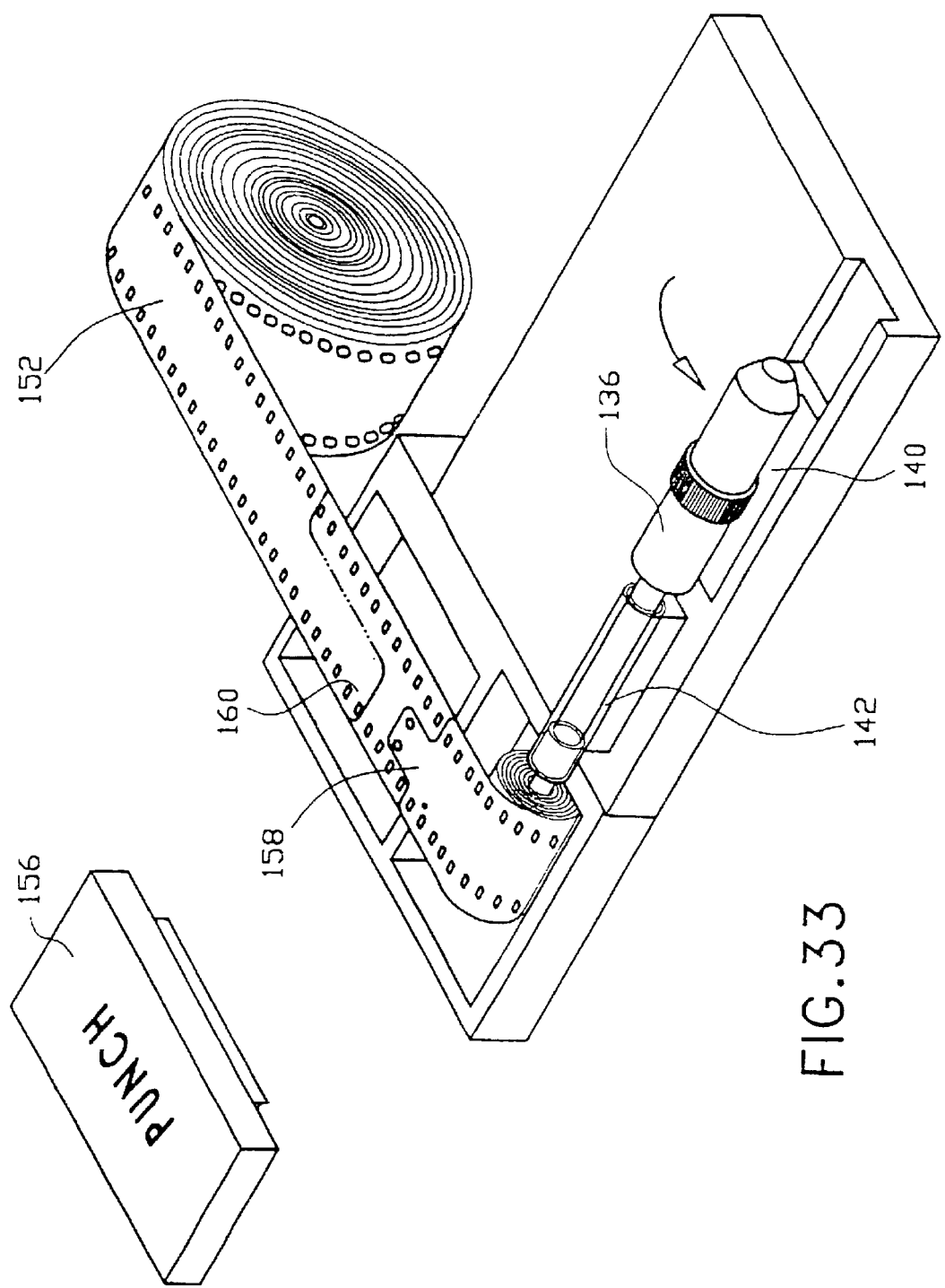
FIG. 33 shows the length of film being cut from the bulk film supply.
Figure 36:
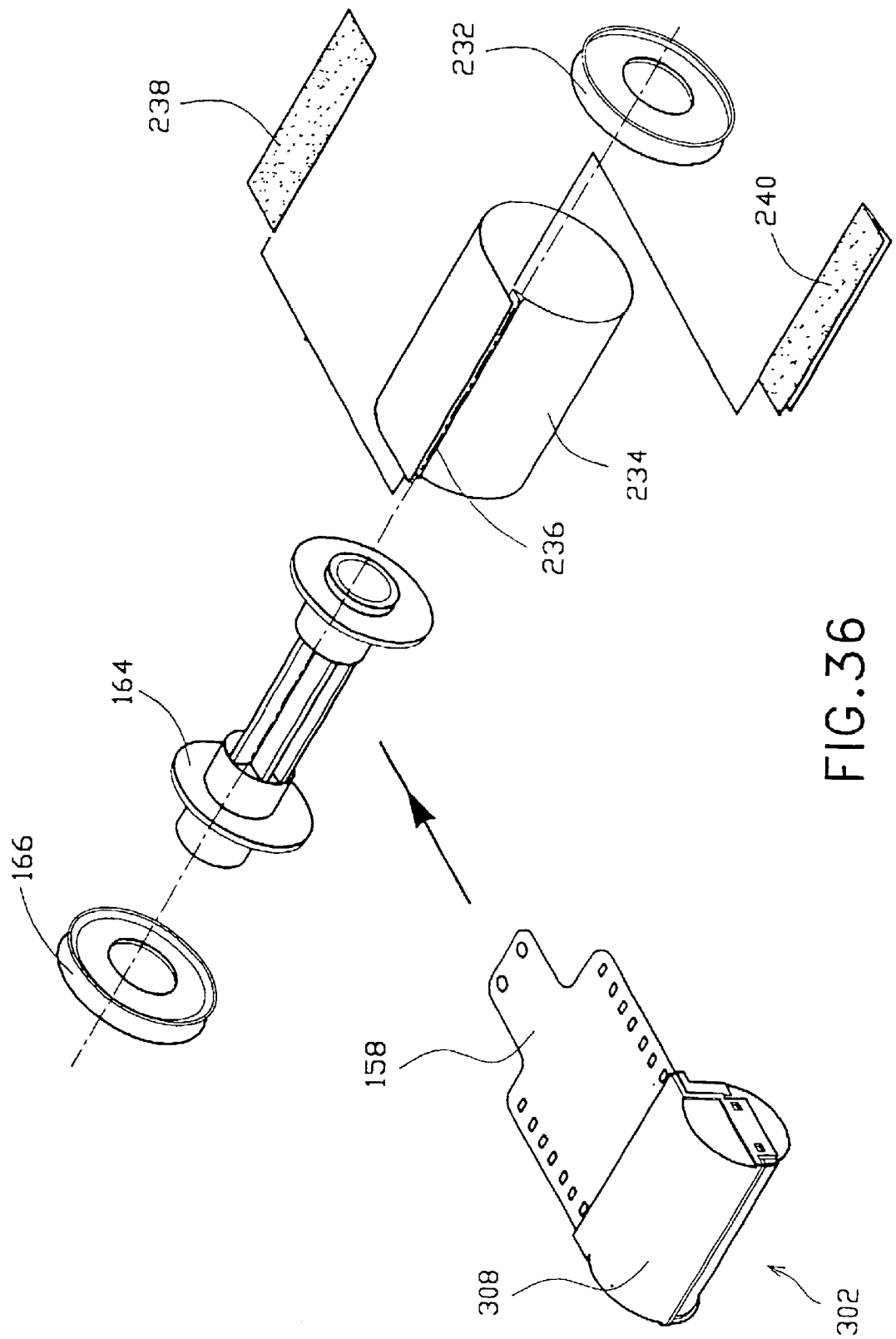
FIG. 36 shows the assembled film container being secured to a conventional film patrone.
Figure 37:
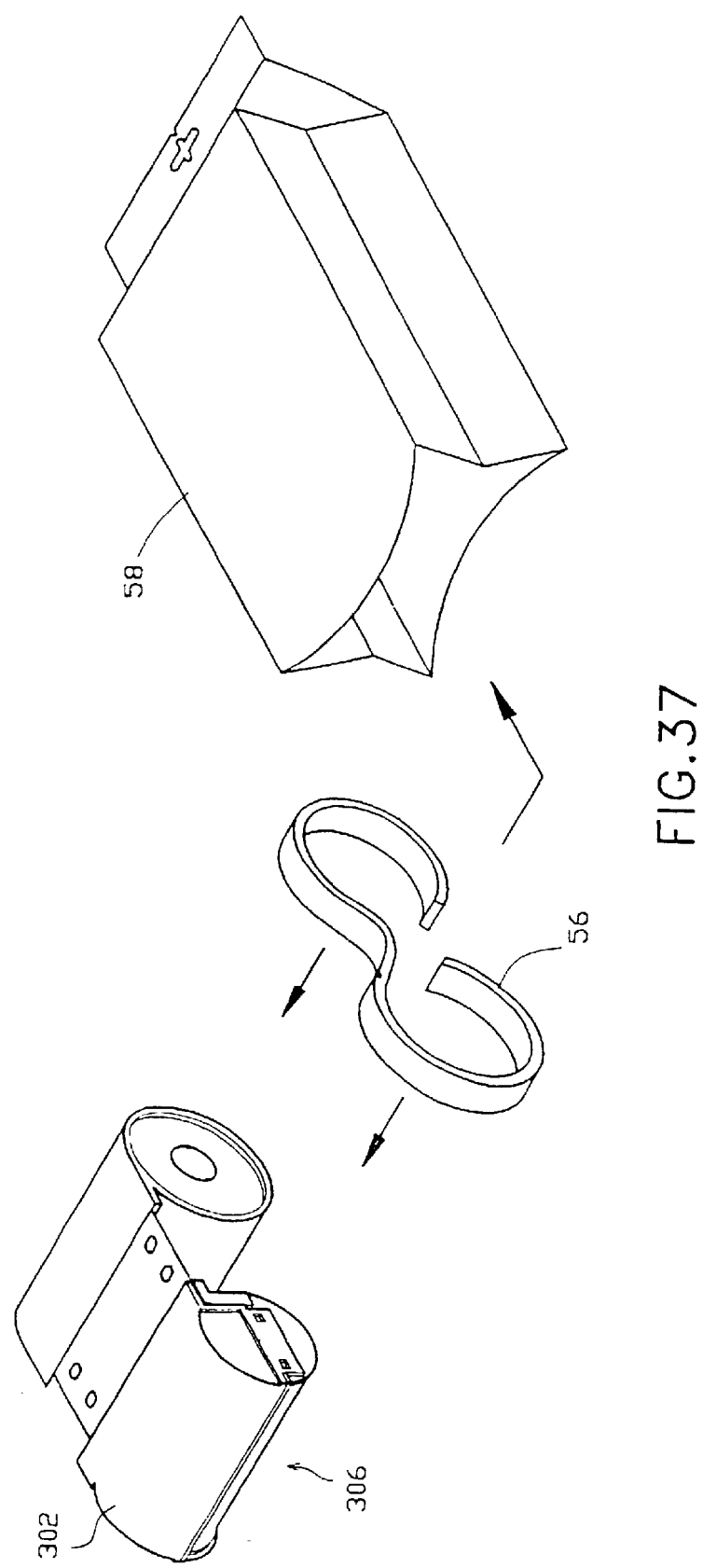
FIG. 37 shows the finished film assembly being secured by a film clip and sealed into a film package.

The loading method utilizes a film winding apparatus which is near-identical to that as described above, the structure of which will not further described and with like parts being indicated by like reference numerals. There is a minor difference in that the jig 346 need not have a cut-out end region for insertion of the film container, and as can be seen in FIG. 32 the jig has continuous sidewall. As indicated in FIG. 32 the leading end of the film is unwound from the bulk roll of film 152 housed in light-tight housing 151, and is attached to the end of the film winding tool 144. The motor 136 is operated to wind a length of film onto the winding tool. The length of wound film is separated using the punch 156 which cuts the tongue 158 in the trailing edge of the wound film, and the tongue 160 at the new leading end of the bulk roll of film. The film winding tool 134 is then retracted by withdrawing the motor 136, moving the slide 140 away from the sleeve 142. The wound roll of film is then, as indicated in FIG. 35, placed within the housing 308 with the two shell halves 310 and 312 being secured together to enclose the film therein, and with the tongue 158 protruding through the film slot. Container 302 is then secured to the conventional film patrone as indicated in FIG. 36. The assembly 306 comprising the film container 302, film patrone and film extending therebetween is then ready for insertion into a camera, or ready for being sealed a film package 58, secured with the assistance of the clip 56 in the same manner, as discussed above.

Figure 38:
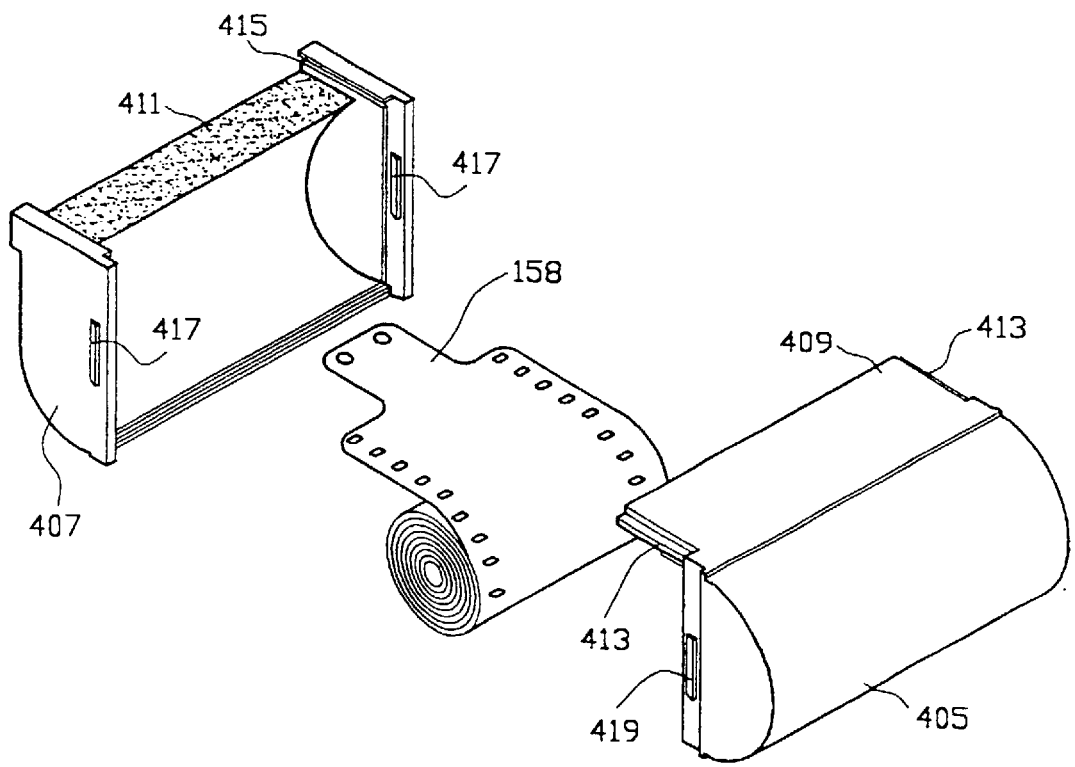
FIG. 38 shows prior to assembly a film container in accordance with a further embodiment of the invention.
Figure 39:
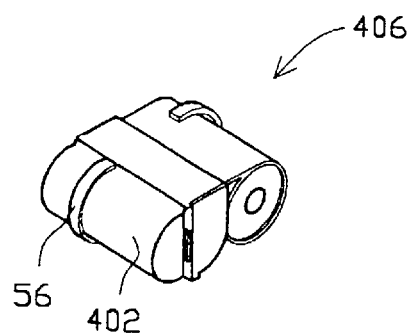
FIG. 39 shows a film assembly using the film container of FIG. 38.

A further alternative structure of film container 402 is shown in FIG. 38. This is similar to that of the previously described embodiment in that the housing comprises a pair of shell halves; however, instead of being divided about a plane which is generally parallel to the plane defined by the exiting film, the housing is divided about a plane perpendicular thereto into shell halves 405, 407. Shell half 405 has an extended ledge 409 which overlies ledge 411 defining the film slot therebetween, each having a strip of velvet secured thereto. At its edges the ledge 409 is provided with regions of reduced thickness 413 which slide into corresponding grooves 415 in the shell half of 407. Shell half 407 is also provided with slots 417 at opposite edges, whilst shell half 405 is provided with protrusions 419 which thereby provide a snap-fit connection as the shell halves are fitted together. FIG. 39 shows the assembled and loaded film container 402 in combination with a conventional film patrone constituting an assembly 406 secured together with a clip 56. Shell half 407 is provided with two elongate ridges 413 at opposite sides thereof which snap-fit into corresponding grooves or openings 415 on the shell half 405 to thereby secure the two shell halves together about the film coil. A loading method which is identical to that described with reference to FIGS. 32 to 36 is utilized, whilst the film assembly 406 may likewise be sealed in an airtight package 58 if desired.

Figure 40:
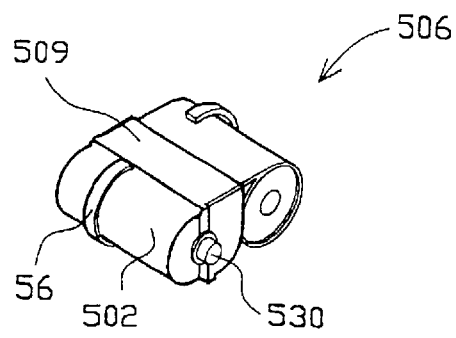
FIG. 40 shows a film assembly using a film container in accordance with a still further embodiment of the invention.

A still further embodiment of a film container is shown in FIG. 40 which like that of FIGS. 38 and 39 has a two-part housing which is essentially divided about a plane which is generally perpendicular to the plane defined by the exiting film. The housing 502 has ledges 509, 511 which define therebetween the film slot. In a similar manner to the embodiment of FIGS. 24, 29 and 30, the shell halves define an aperture therebetween for a film-winding tool and which in the assembled and loaded container 502 is closed by a plug 530. Lugs provided on one shell half are provided to allow a snap-fit connection with apertures or recesses on the other shell half. The container is loaded with film in a similar manner to that described in relation to FIGS. 25 to 29, and connected to a conventional patrone in the way illustrated in FIG. 30 to give the final film assembly 506, which is shown fitted with a clip 56 in FIG. 40.

Figure 41:
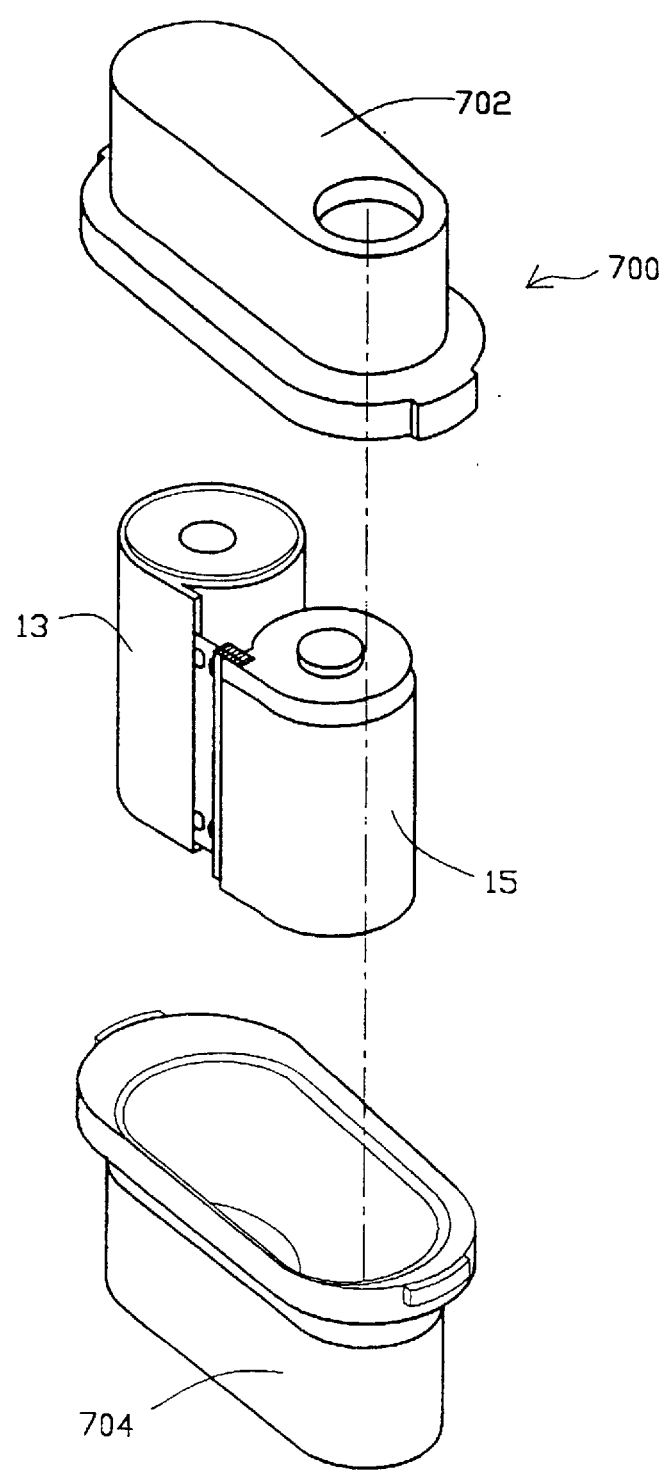
FIG. 41 shows a canister for containing a film assembly.

As an alternative to use of a clip and a sealed package, as shown in FIG. 41, an outer housing or canister 700 may be provided. This is adapted to hold the film container and film patrone securely and in a fixed relative orientation. The canister 700 has upper 702 and lower 704 parts which may be snap-fitted or push-fitted together.

The use of the film containers 15, 102, 202, 302, 402, 502 allows the film winding to be carried out in a very simple and therefore cheap manner and allows a film assembly to be provided which can be sold to an end user so that the end user can himself re-load the camera.

What is claimed is:

1. A photographic film-receiving container having a housing free of any film spool and comprising a pair of shell halves which together define a film slot through which, in use, film may extend wherein each shell half is provided with an edge region which faces the edge region of the other shell half defining the film slot therebetween and defining a film exit plane, the two shell halves of the housing being joined along a plane substantially parallel to said exit plane.

2. A photographic film-receiving container according to claim 1 having securing means for securing the two shell halves together.

3. A photographic film-receiving container according to claim 2 wherein the securing means provide a snap-fit connection between the two shell halves.

4. A photographic film-receiving container according to claim 3 wherein the securing means comprise protrusions formed on one shell half which snap-fit into corresponding apertures or recesses in the other shell half.

5. A photographic film-receiving container according to claim 4 wherein the apertures or recesses are formed in lugs extending from the said one shell half.

6. A film assembly comprising a film-receiving container according to claim 1 having a length of film wound therein and extending to a first film container having a spool therein to which an end of the length of the film is attached.

7. A photographic film-receiving container having a housing free of any film spool and comprising a pair of shell halves which together define a film slot through which, in use, film may extend wherein each shell half is provided with an edge region which faces the edge region of the other shell half, defining the film slot therebetween and defining a film exit plane, the two shell halves of the housing being joined along a plane substantially perpendicular to said exit plane and parallel to the container axis.

8. A photographic film-receiving container according to claim 7 having securing means for securing the two shell halves together.

9. A photographic film-receiving container according to claim 8 wherein the securing means provide a snap-fit connection between the two shell halves.

10. A photographic film-receiving container according to claim 9 wherein the securing means comprise protrusions formed on one shell half which snap-fit into corresponding apertures or recesses in the other shell half.

11. A photographic film-receiving container according to claim 10 wherein the apertures or recesses are formed in lugs extending from the said one shell half.

12. A photographic film-receiving container according to claim 7 wherein:
one shelf half has a sidewall and a pair of opposite ends with edges which define a plane with a first longitudinal edge of the sidewall, an edge of the sidewall opposite to said first longitudinal edge being displaced with respect to said first plane;
the other shell half has a sidewall and a pair of opposite ends with edges which define a plane with a second longitudinal edge of the sidewall, an edge of the sidewall opposite to the second sidewall being formed in an extension of the sidewall;
whereby when joined together the sidewall extension overlies the displaced edge of the sidewall defining the film slot therebetween.

13. A photographic film-receiving container according to claim 12 wherein the opposite ends of said one shell half are further formed with inwardly directed grooves at opposed edge region which extends perpendicular to the first plane towards the sidewall edge opposite to the first longitudinal sidewall and within which the opposite edges of the sidewall extension of the said other shell half are slidingly received.

14. A photographic film-receiving container according to claim 13 wherein the said opposite edges of the sidewall extension include portions of reduced thickness which are slidingly received in the grooves.

15. A film assembly comprising a film-receiving container according to claim 7 having a length of film wound therein and extending to a first film container having a spool therein to which an end of the length of film is attached.

16. A film assembly comprising a first film container having a spool therein to which an end of the film is attached and about which the film may be wound, and a second spoolless light-tight film container within which the film may be wound having a removable end cap, the film extending between the first and second containers and being wound within one or other of said containers, wherein a removable clip of a springy construction which tightly grips each film container is provided to hold the first and second containers in a fixed position relative to each other.

17. A film assembly according to claim 16 wherein the second container has a film slot which is lined with velvet.

18. A film assembly according to claim 17 when sealed inside an air-tight package.

19. A film assembly according to claim 18 wherein said package is formed of metallized plastics material.

20. A film assembly according to claim 17 when contained in a protective canister.

21. A spoolless photographic film-receiving container having a generally cylindrical housing comprising a pair of shell halves securable together by securing means, the shell halves being joined together about a plane parallel to the housing axis, one shell half having opposite ends and a sidewall together defining edges which define a first plane with a fourth edge of a further sidewall retracted from said plane and defining a first lip, the other shell half having three edges on two opposite ends and a sidewall respectively which together define a plane at which the shell halves are joined and having a fourth edge raised relative to the plane on a further sidewall constituting a second lip and defining with said first raised lip a film slot therebetween.

22. A photographic film-receiving container according to claim 21 wherein the securing means provide a snap-fit connection between the two shell halves.

23. A photographic film-receiving container according to claim 22 wherein the securing means comprise protrusions formed on one shell half which snap-fit into corresponding apertures or recesses in the other shell half.

24. A photographic film-receiving container according to claim 23 wherein the apertures or recesses are formed in lugs extending from the said one shell half.

25. A film assembly comprising a film-receiving container according to claim 21 having a length of film wound therein and extending to a first film container having a spool therein to which an end of the length of film is attached.

26. A spoolless photographic film-receiving container having a generally cylindrical housing comprising a pair of trough-like shell halves securable together by securing means the shell halves being joined together about a plane parallel to the housing axis wherein one shell halve has a wall extending from one side in a direction perpendicular to said plane, the other shell half having a cutaway region and covered by said extending wall when the shell halves are secured together, an edge region adjacent the cutaway area defining with an end of the extending wall a film slot.

27. A photographic film-receiving container according to claim 26 wherein said other shell halve has edge regions in said cutaway region extending generally perpendicular to said plane each formed with inwardly directed grooves within which opposite edges of the extending wall of said one shell half are slidingly received.

28. A photographic film-receiving container according to claim 27 wherein said opposite edges of the sidewall extension include portions of reduced thickness which are slidingly received in the grooves.

29. A photographic film-receiving container according to claim 26 wherein the securing means provide a snap-fit connection between the two shell halves.

30. A photographic film-receiving container according to claim 29 wherein the securing means comprise protrusions formed on one shell half which snap-fit into corresponding apertures or recesses in the other shell half.

31. A photographic film-receiving container according to claim 30 wherein the apertures or recesses are formed in lugs extending from the said one shell half.

32. A film assembly comprising a film-receiving container according to claim 26 having a length of film wound therein and extending to a first film container having a spool therein to which an end of the length of film is attached.

33. A photographic film-receiving container having a housing free of any film spool and comprising a pair of shell halves which together define a film slot through which, in use, film may extend, wherein the housing further defines an aperture for insertion of a film winding tool for engaging film to be wound into the container.

* * * * *